(12) United States Patent
Itou et al.

(10) Patent No.: US 12,150,469 B2
(45) Date of Patent: Nov. 26, 2024

(54) FOOD MATERIAL PROCESSING MECHANISM, FOOD MATERIAL PROCESSING METHOD, AND FOOD MANUFACTURING METHOD

(71) Applicant: NICHIREI FOODS INC., Tokyo-to (JP)

(72) Inventors: Ryuichi Itou, Chiba (JP); Toru Iwasa, Chiba (JP); Minoru Mamiya, Chiba (JP); Suguru Hirayama, Chiba (JP)

(73) Assignee: NICHIREI FOODS INC., Tokyo (JP)

( * ) Notice: Subject to any disclaimer, the term of this patent is extended or adjusted under 35 U.S.C. 154(b) by 596 days.

(21) Appl. No.: 17/284,173

(22) PCT Filed: Oct. 4, 2019

(86) PCT No.: PCT/JP2019/039411
§ 371 (c)(1),
(2) Date: Apr. 9, 2021

(87) PCT Pub. No.: WO2020/075657
PCT Pub. Date: Apr. 16, 2020

(65) Prior Publication Data
US 2021/0329961 A1 Oct. 28, 2021

(30) Foreign Application Priority Data
Oct. 10, 2018 (JP) .................................. 2018-191966

(51) Int. Cl.
*A23P 20/20* (2016.01)
(52) U.S. Cl.
CPC .................................. *A23P 20/20* (2016.08)

(58) Field of Classification Search
CPC ........................................................ A23P 20/20
(Continued)

(56) References Cited

U.S. PATENT DOCUMENTS

| 4,073,953 A * | 2/1978 | Trostmann ............. A21D 13/30 426/549 |
| 4,608,919 A | 9/1986 | Prows et al. |

(Continued)

FOREIGN PATENT DOCUMENTS

| CN | 1111093 A | 11/1995 |
| CN | 203851707 U | 10/2014 |

(Continued)

OTHER PUBLICATIONS

International Search Report, issued in PCT/JP2019/039411, PCT/ISA/210, dated Dec. 17, 2019.
(Continued)

*Primary Examiner* — Dana Ross
*Assistant Examiner* — Joseph W Iskra
(74) *Attorney, Agent, or Firm* — Birch, Stewart, Kolasch & Birch, LLP

(57) ABSTRACT

A food material processing mechanism (71) includes: a conveyance unit (11) that conveys a soft food material (81) in a conveyance direction (D1); a support unit (30) that is provided rotatably with respect to a rotation shaft extending in a width direction (D2) orthogonal to the conveyance direction (D1), to support the soft food material (81) conveyed by the conveyance unit (11); and a pressing unit (40) that presses a part of a folded portion (81a) of the soft food material (81) supported by the support unit (30) by jetting air thereto, to form a bending reference portion (85) serving as a reference portion for bending.

5 Claims, 20 Drawing Sheets

(58) Field of Classification Search
USPC .......................................................... 99/450.6
See application file for complete search history.

(56) References Cited

U.S. PATENT DOCUMENTS

| | | |
|---|---|---|
| 6,170,391 B1 | 1/2001 | Pomara, Jr. |
| 8,505,445 B2 | 8/2013 | Robert |

FOREIGN PATENT DOCUMENTS

| | | | |
|---|---|---|---|
| FR | 2 701 631 A1 | | 8/1994 |
| FR | 2701631 | * | 8/1994 |
| JP | 50-157578 A | | 12/1975 |
| JP | 57-198042 A | | 12/1982 |
| JP | 7-194289 A | | 8/1995 |
| JP | 2918463 | * | 8/1995 |

OTHER PUBLICATIONS

Written Opinion of the International Searching Authority, issued in PCT/JP2019/039411, PCT/ISA/237, dated Dec. 17, 2019.
English translation of the International Preliminary Report on Patentability and Written Opinion of the International Searching Authority for International Application No. PCT/JP2019/039411, dated Apr. 22, 2021.

* cited by examiner

FOOD MATERIAL PROCESSING MECHANISM, FOOD MATERIAL PROCESSING METHOD, AND FOOD MANUFACTURING METHOD

TECHNICAL FIELD

The present invention relates to a food material processing mechanism and a food material processing method which process a sheet-shaped soft food material, and a food manufacturing method which uses a processed sheet-shaped soft food material.

BACKGROUND ART

Various processed foods are widely provided not only to general consumers but also to stores. Processed foods can be provided in various forms, such as room temperature foods, refrigerated foods, chilled foods and frozen foods, by the development of food material processing technology (in particular, the development of refrigeration technology and freezing technology). Demands for such processed foods are expected to increase further in the future as consumers' tastes diversify, needs for convenience increase, and awareness of food safety increases. In particular, it is desired to provide not only processed foods that are easy to process but also processed foods that are complicated and difficult to process.

Examples of such processed foods include rolled foods such as a spring roll and an egg roll. In order to make a rolled food, it is necessary to wrap a filling with a skin made of wheat flour or the like. Proper skill and experience are necessary for neatly and appropriately wrapping a filling with a skin, and such work is very difficult for those who are not accustomed to cooking and is often avoided. In addition, it is difficult even for a person who is accustomed to cooking to make a large amount of rolled foods with uniform quality, and it is a burdensome work that requires time and labor. Therefore, processors make large quantities of rolled foods using a food manufacturing apparatus that is able to automatically manufacture such rolled foods.

For example, Patent Document 1 discloses a method and an apparatus for automatically entraining a filling in a skin material. In the apparatus disclosed in Patent Document 1, while conveyance of the skin material with a filling thereon is once stopped, a front part of the skin material is lifted and bent by rocking of a swinging pestle and a filling is covered with the front part. Then, the covered part is held by another swinging pestle lowered from above. When a filling is wrapped with a skin by the apparatus in this way, the skin which is positively bent by a member is placed on the filling.

Further, Patent Document 2 discloses an apparatus which folds a pastry dough a plurality of times in such a manner that a food (a spring roll, tacos, etc.) in which a filling is wrapped by the pastry dough is manufactured. In the case of this apparatus, a skin material paled on a filling is pressed by a pressing plate 52.

Patent Document 1: JPS50-157578A

Patent Document 2: U.S. Pat. No. 8,505,445B

While food manufacturing apparatuses which are capable of automatically wrapping a filling with a skin, such as the apparatus in Patent Document 1 described above, are already known, it is desired to further improve such apparatuses and methods.

Specifically, an apparatus and a method which are capable of manufacturing a large amount of rolled foods with more uniform and higher quality are desired. For example, if folded parts of skins vary between the skins when a filling is wrapped with the skins, not only the aesthetic appearance of the rolled foods is spoiled, but also the deliciousness such as texture is adversely affected, and therefore, there is also a concern that predetermined standards are not met and thus the value as a product is completely impaired.

In addition, processing speed is also important in order to manufacture as many rolled foods as possible during a limited time. In particular, while delicate handling is required when a filling is wrapped with a soft and breakable skin, it is not easy to perform such delicate handling at high speed and reliably. Further, in a production system where other works are continuously performed before and after the work of wrapping a filling with a skin, such as a production system for spring rolls, there is also a concern that the work of wrapping a filling with a skin becomes a bottleneck, so that the improvement of the productivity of the entire system is hindered.

The present invention has been contrived in view of the above circumstances, and an object of the present invention is to provide a food material processing mechanism, a food material processing method and a food manufacturing method which enable highly accurate processing of a sheet-shaped soft food material such as a skin. Further, an object of the present invention is to provide a food material processing mechanism, a food material processing method and a food manufacturing method which can improve the productivity of a food.

DISCLOSURE

One aspect of the present invention relates to a food material processing mechanism that process a sheet-shaped soft food material including a folded portion where at least a portion of the sheet-shaped food material is folded back, comprising: a conveyance unit that conveys the soft food material in a conveyance direction; a support unit that is provided rotatably with respect to a rotation shaft extending in a width direction orthogonal to the conveyance direction, to support the soft food material conveyed by the conveyance unit; and a pressing unit that presses a part of the folded portion of the soft food material supported by the support unit by jetting air thereto, to form a bending reference portion serving as a reference portion for bending.

In the food material processing mechanism according to the aspect of the present invention, the pressing unit may press the part of the folded portion along the width direction.

In the food material processing mechanism according to the aspect of the present invention, the pressing unit may be provided rotatably with respect to the rotation shaft.

In the food material processing mechanism according to the aspect of the present invention, the support unit may be rotated to a downstream side of the conveyance direction, while supporting the soft food material conveyed by the conveyance unit.

In the food material processing mechanism according to the aspect of the present invention, the support unit may include a body part coupled to the rotation shaft, and a distal end part coupled to the body part, and when the support unit is rotated to the downstream side of the conveyance direction, the distal end part vertically may reverse the folded portion at least partially along the bending reference portion.

Another aspect of the present invention relates to a food material processing method for manufacturing rolled food, including a step of bending a sheet-shaped soft food material, wherein in the step of bending the sheet-shaped soft food material, a part of a folded portion of the sheet-shaped soft material that is at least partially folded back is pressed by jetting air thereto, to form a bending reference portion serving as a reference portion for bending.

In the food material processing method according to the aspect of the present invention, the formation of the bending reference portion may be performed to the sheet-shaped soft food material that is conveyed by a successively traveling conveyance body.

In the food material processing method according to the aspect of the present invention, it may further include a step of vertically reversing the sheet-shaped soft food material at least partially with reference to the bending reference portion.

Another aspect of the present invention relates to a rolled-food manufacturing method including a step of processing a sheet-shaped soft food material by the food material processing method according to the aspect of the present invention.

The present invention enables a sheet-shaped soft food material, such as a skin, to be accurately processed. In addition, the present invention can improve food productivity.

DESCRIPTION OF EMBODIMENTS

Hereinafter, typical embodiments of the present invention will be described as examples with reference to the drawings. For convenience of illustration and understanding, the size and the scale of the elements shown in each drawing do not necessarily correspond to a real thing and do not necessarily correspond to each other between the drawings. However, those skilled in the art could clearly understand the configurations, the actions and the effects of the elements shown in each of the drawings, in light of the descriptions of the present specification and the claims.

In the following embodiments, a system which manufactures spring rolls is described as an example, and a skin for a spring roll is used as a "sheet-shaped soft food material". The present invention is not limited to the following embodiments, and the present invention may be applied to foods other than spring rolls. Typically, the present invention can be suitably applied to rolled foods in which a filling is wrapped with a skin. However, the present invention can also be applied to apparatuses and methods which manufacture other foods, and for example, it is also possible to apply the present invention to an apparatus which manufactures a food (such as an egg roll) which is formed by a skin only without any filling inside thereof.

[Example of Method of Manufacturing Spring Roll]

FIGS. 1A to 1F are views for describing an example of a method of manufacturing a spring roll (in particular, a technique for folding a skin). FIG. 2 is a flowchart of the method of manufacturing a spring roll shown in FIGS. 1A to 1F.

Figure 1A:
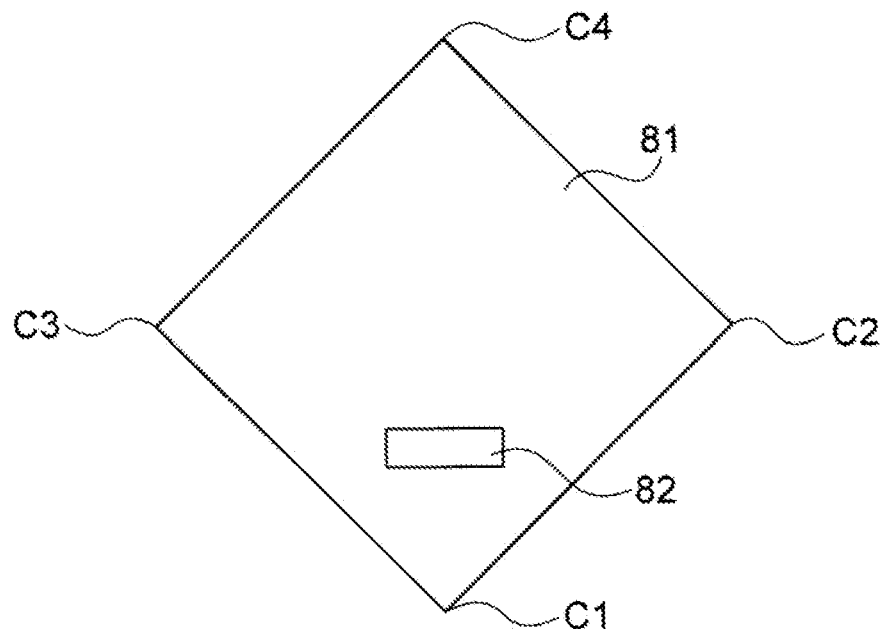
FIG. 1A is a diagram for explaining an example of a method of manufacturing a spring roll (in particular, a technique for folding a skin).
Figure 2:
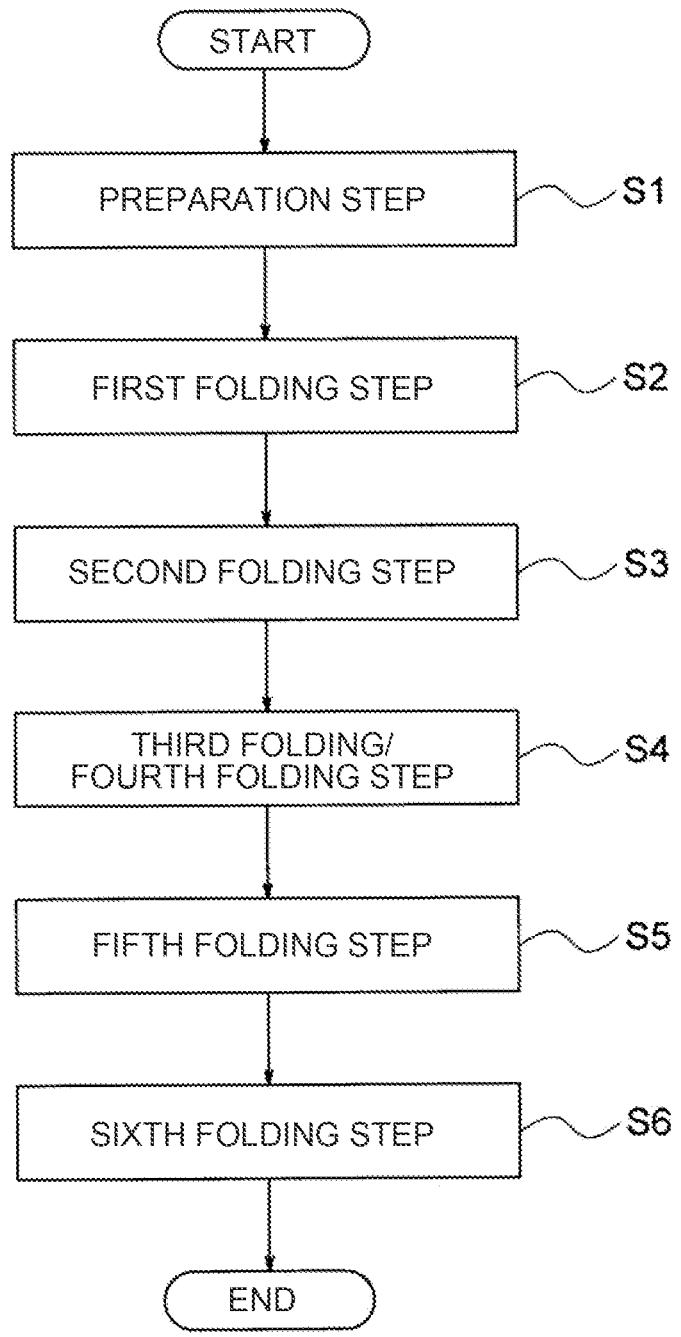
FIG. 2 is a flowchart of the method of manufacturing a spring roll illustrated in FIGS. 1A to 1F.

First, a filing 82 is placed on a skin 81 which has been spread as shown in FIG. 1A (preparation step S1). In this example, the filling 82 is placed on one of the two isosceles triangles (i.e., the lower triangle in FIG. 1A) included in the quadrangular (in particular, square) skin 81.

Figure 1B:
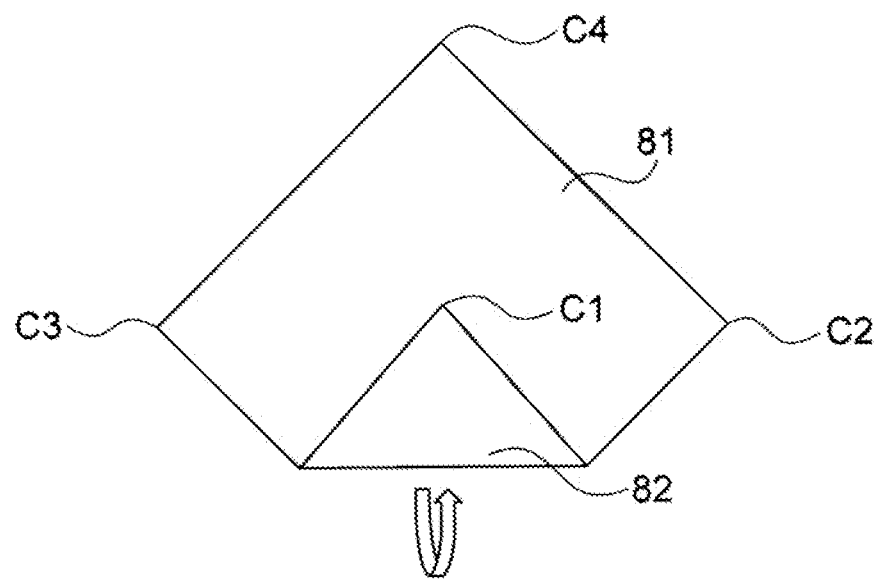
FIG. 1B is a diagram for explaining an example of a method of manufacturing a spring roll (in particular, a technique for folding a skin).

Then, as shown in FIG. 1B, a part of the skin 81 is folded back, so that the filling 82 is covered and wrapped with the skin 81 (first folding step S2). In this example, one of the four vertices of the skin 81 (i.e., the lower vertex in FIG. 1B; hereinafter referred to also as "first vertex C1") is folded back toward the opposite vertex.

Figure 1C:
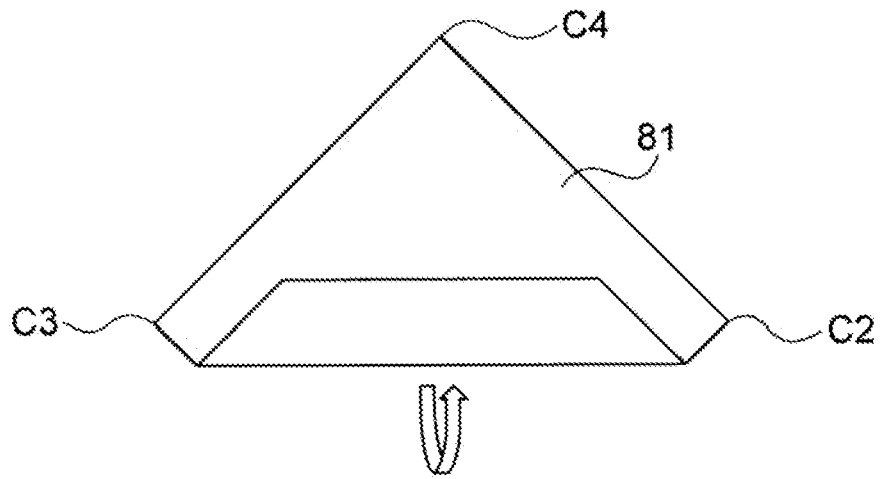
FIG. 1C is a diagram for explaining an example of a method of manufacturing a spring roll (in particular, a technique for folding a skin).

Then, as shown in FIG. 1C, the skin 81 is further folded back, so that the filling 82 is wrapped by the skin 81 (second folding step S3). In this example, the skin 81 is folded back in such a manner that all or part of the portion of the skin 81, which has been positioned above the filling 82 immediately after the first folding step S2, is positioned below the filling 82.

Figure 1D:
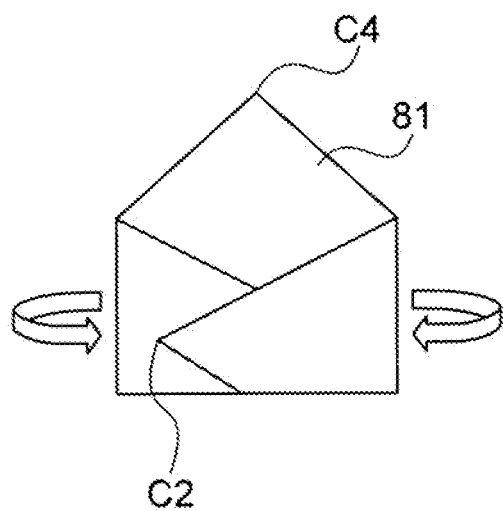
FIG. 1D is a diagram for explaining an example of a method of manufacturing a spring roll (in particular, a technique for folding a skin).

Then, as shown in FIG. 1D, the right and left portions of the skin 81 are folded back, so that the filling 82 is covered also by these right and left portions of the skin 81 (third folding/fourth folding step (skin bending step) S4). In this example, two vertices (i.e., the left and right vertices in FIG. 1D; hereinafter referred to also as "second vertex C2" and "third vertex C3") arranged adjacent to the first vertex C1, included in the folded portion in the first folding step S2 and the second folding step S3, are moved in such a manner that the skin 81 is folded in the directions perpendicular to the bending direction of the skin 81 in the first folding step S2 and the second folding step S3.

Figure 1E:
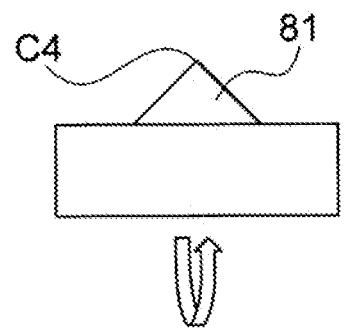
FIG. 1E is a diagram for explaining an example of a method of manufacturing a spring roll (in particular, a technique for folding a skin).

Then, as shown in FIG. 1E, the filling 82 is further rolled toward the remaining vertex (i.e., upper vertex in FIG. 1D; hereinafter referred to also as "fourth vertex C4") along with the portion of the skin 81 covering the filling 82, so that the filling 82 is further wrapped with the skin 81 (fifth folding step S5). In this situation, a portion of the skin 81 including the fourth vertex C4 is located outside the filling 82.

Figure 1F:
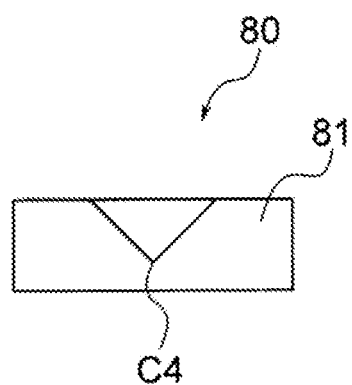
FIG. 1F is a diagram for explaining an example of a method of manufacturing a spring roll (in particular, a technique for folding a skin).

Then, as as shown in FIG. 1F, the portion of the skin 81 including the fourth vertex C4 is folded back to cover the filling 82 (sixth folding step S6). At this time, the portion of the skin 81 including the fourth vertex C4 may be attached to the portion of the skin 81 which has already covered the filling 82. A liquid containing a binder component, such as wheat flour, or a liquid (water or the like) not containing such a binder component may be used as glue for attaching positions of the skin 81 to each other.

By carrying out the series of the aforementioned steps (preparation step S1 to sixth folding step S6), a spring roll 80 having a rectangular planar shape can be produced (see FIG. 1F). As described above, in order to produce a spring roll 80, a skin 81 is bent in each step (in particular, the first folding step S2 to the sixth folding step S6). In order to finally obtain a spring roll 80 which has an excellent aesthetic appearance, it is important to properly fold a skin 81 in each step. In particular, in the second folding step S3, it is difficult to further fold a skin 81 with high quality and uniformly because a part of the skin 81 has been folded back in the first folding step S2 so that the filling 82 is covered and wrapped with the skin 81, as shown in FIG. 1B.

Figure 3:
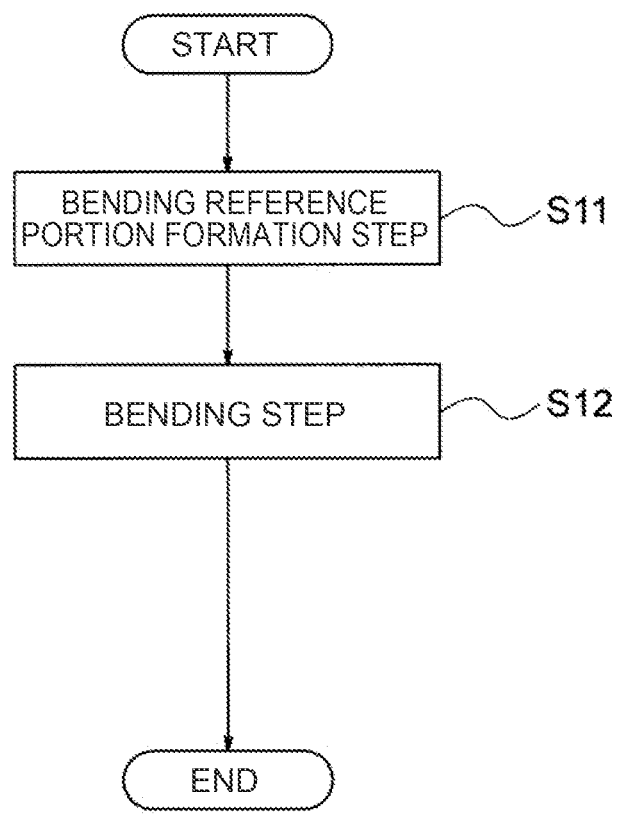
FIG. 3 is a flowchart showing an example of a second folding step.
Figure 4:
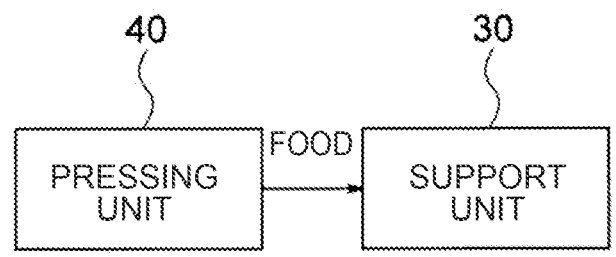
FIG. 4 is a block diagram of mechanisms which carry out the second folding step illustrated in FIG. 3.

Thus, the second folding step S3 in this embodiment is carried out as shown in FIGS. 3 and 4.

FIG. 3 is a flowchart showing an example of the second folding step S3. FIG. 4 is a block diagram of mechanisms which carry out the second folding step S3 shown in FIG. 3.

The second folding step S3 in this embodiment includes a bending reference portion formation step S11 and a bending step S12.

In the bending reference portion formation step S11, a reference portion for the folding performed in the second folding step S3 (hereinafter referred to also as "bending reference portions") is formed in a skin 81 by a below-described pressing unit 40 of food material processing mechanism 71. The concept of "bending reference portion" may be a reference portion of a skin 81 to be folded in a broad sense, and it is not necessary that a crease or a mark is given to the reference portion. The formation of such a bending reference portion may be performed in a state where a filling 82 is placed on a skin 81 or may be performed in a state where a filling 82 is not placed on a skin 81. The pressing unit 40 of the food material processing mechanism 71, which is described later, locally applies pressure to a skin 81. A bending reference portion is formed by a part of the skin 81 which has been locally pressed.

In the bending step S12, the skin 81 is bent with reference to the bending reference portion, by a below-described support unit 30 of the food material processing mechanism 71.

Herebelow, a specific configuration example of the food material processing mechanism 71 is described. In this embodiment, an apparatus (including mechanism) and a method according to the present invention are applied to the second folding step S3, but an apparatus and a method according to the present invention may be applied to another step involving bending of a skin 81 (e.g., first folding step S2, third folding/fourth folding step S4, fifth folding step S5 and sixth folding step S6).

A skin 81 to which the second folding step S3 is performed by the food material processing mechanism 71 is firstly described.

[Skin (Sheet-Shaped Soft Food Material)]

A skin 81 includes a base portion 86 (see, e.g., FIGS. 5 and 9A) and a folded portion 81a (see, e.g., FIGS. 5 and 9A) which is formed by folding a part of the skin 81, and a bending reference portion (see FIGS. 12 and 13) formed on the folded portion 81a.

The base portion 86 is a portion of a skin 81, which is not folded back and is still spread in the aforementioned first folding step S2. In this embodiment, a filling 82 is placed on the base portion 86. While the skin 81 is being conveyed by a conveyance unit 11, the base portion 86 is sent from the upstream side to the downstream side, with its horizontally extended state being maintained.

The folded portion 81 is a portion of the skin 81, which has been folded back in the aforementioned first folding step S2. The folded portion 81a in this embodiment covers the filling 82.

The bending reference portion 85 is a portion of the skin 81, which forms a crease, and is formed on the skin 81 by the food material processing mechanism 71 (see FIGS. 5 to 15) in the second folding step S3. The bending reference portion 85 is formed near a boundary between the skin 81 of the folded portion 81a, which is in tight contact with the filling 82, and the skin 81 of the folded portion 81a, which is in tight contact with the skin 81 of the base portion 86. In this embodiment, the bending reference portion 85 extends parallel to a width direction D2 of the skin 81.

[Food Material Processing Mechanism]

FIGS. 5 to 8 are plan views of the food material processing mechanism 71. FIGS. 9A and 10 to 15 are side views of the food material processing mechanism 71. FIG. 9B is a rear view of the support unit 30 of the food material processing mechanism 71. Although the state of the skin 81 shown in FIGS. 5 to 15 does not necessarily exactly correspond to the state of the skin shown in FIGS. 1B and 1C described above, FIGS. 5 to 15 are drawings corresponding to the second folding step S3 (see FIG. 2).

The food material processing mechanism 71 in this embodiment is for processing a sheet-shaped skin 81 including a folded portion 81a where at least a portion of the skin 81 is folded back. This food material processing mechanism 71 comprises: a conveyance unit 11 that conveys a sheet-shaped skin 81 in a conveyance direction D1; a support unit 30 that is provided rotatably with respect to a rotation shaft 31 extending in the width direction D2 orthogonal to the conveyance direction D1, to support the skin 81 conveyed by the conveyance unit 11; and a pressing unit 40 that presses a part of the folded portion 81a of the skin 81 supported by the support unit 30 by jetting air thereto, to form a bending reference portion 85 serving as a reference portion for bending.

Both the conveyance direction D1 and the width direction D2 in this embodiment are horizontal directions which are perpendicular to the vertical direction on which gravity acts, but may be directions which are inclined with respect to a height direction D3 parallel to the vertical direction and the horizontal directions.

In the description below, an object conveyed by the conveyance unit 11 is referred to also as work W. In this embodiment, a filing 82 has been already placed on a skin 81 conveyed by the conveyance unit 11 (see FIGS. 1A to 1C), and the conveyance unit 11 conveys the skin 81 with the filling 82 thereon in the conveyance direction D1. Thus, the skin 81 and the filling 82 conveyed by the conveyance unit 11 are also collectively referred to as work W. The conveyance unit 11 may convey a skin 81 only. In this case, a work W is constituted by a skin 81 only.

[Conveyance Unit]

The conveyance unit 11 includes a conveyance body 28 which travels with a skin 81 (work W) thereon in the conveyance direction D1.

The conveyance body 28 of this embodiment is composed of by a plurality of string-shaped supports 23. Each string-shaped support 23 has an endless shape and extends parallel to the conveyance direction D1. Each string-shaped support 23 is wound around a rotation shaft (not shown), which is positioned on the downstream side of the support unit 30, and a rotation shaft (not shown), which is positioned on the upstream side of the support unit 30, and travels in the conveyance direction D1 in accordance with the axial rotation of at least one of these rotation shafts. Each string-shaped support 23 is reversed at the rotation shaft (not shown) positioned on the downstream side, and travels toward the rotation shaft (not shown) positioned on the upstream side. In addition, each string-shaped support 23 is reversed at the rotation shaft (not shown) positioned on the upstream side, and travels toward the rotation shaft (not shown) positioned on the downstream side.

A support portion of the conveyance unit 11 which supports a skin 81 (work W) is formed by portions of the plurality of string-shaped support 23 traveling from the upstream side to the downstream side which come into contact with the skin 81.

The conveyance body 28 of the conveyance unit 11 is not limited to the string-shaped support 23 shown in the drawings, and may have any structure capable of appropriately conveying a work W from the upstream side to the downstream side.

[Support Unit]

The support unit 30 is configured to be rotated to the downstream side of the conveyance direction, while supporting a skin 81 conveyed by the conveyance unit. In the illustrated structure, when the support unit 30 is rotated to the downstream side of the conveyance direction D1, a below-described distal end part 33 is configured to vertically reverse the folded portion 81a of the skin 81 at least partially along the bending reference portion 85.

The support unit 30 includes a body part 32 coupled to the rotation shaft 31, and the distal end part 33 coupled to the body part 32. The body part 32 is coupled to the rotation shaft 31 through a first coupling member 35. The body part 32 has a flat plate-like shape, and is arranged such that a front surface 32a of the body part 32 spreads in the width direction D2 and the height direction D3 in an initial position (position at which the support unit 30 does not support the skin 81 (see FIGS. 5 and 9A)).

Figure 9A:
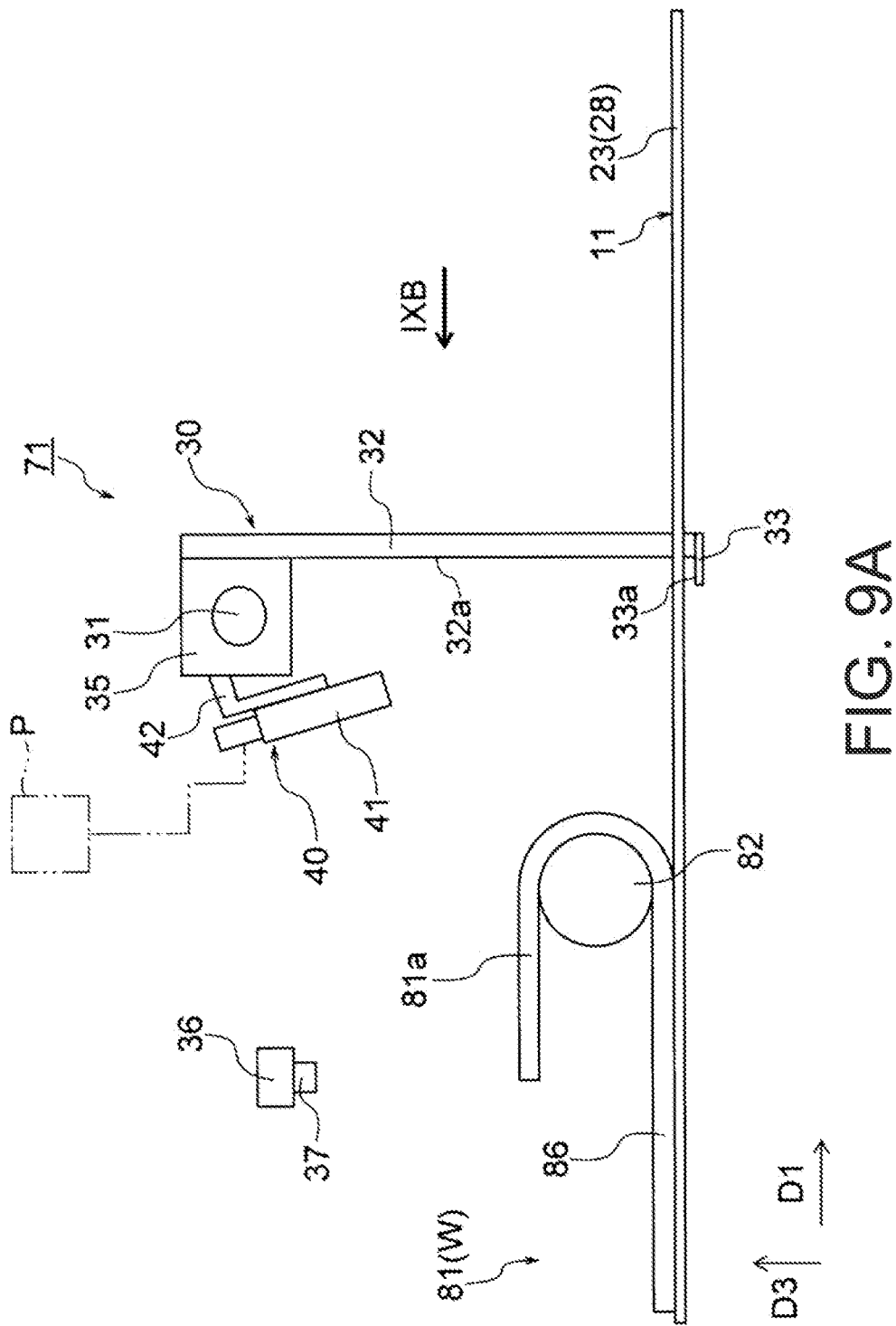
FIG. 9A is a side view of a food material processing mechanism.

As described later, the distal end part 33 has a function of coming into contact with a skin 81 so as to vertically reverse a part of the skin 81. The distal end part 33 extends from the body part 32 to the upstream side of the conveyance direction D1. As shown in FIG. 9A, an upper surface 33a of the distal end part 33 is preferably configured such that, at the initial position, the upper surface 33a is located below the support portion of each string-shaped support 23 which contacts a skin 81. Thus, as described later, the distal end part 33 can be brought into contact with the skin 81 so as to vertically reverse easily a part of the skin 81.

In this case, for example, as shown in FIG. 9B, a plurality of recesses 32b spaced apart from one another may be formed in a lower end of the aforementioned body part 32. The string-shaped supports 23 may be respectively received in the recesses 32b, in order that the body part 32 and the string-shaped supports 23 do not interfere with each other. The distal end part 33 is mounted on a portion of the lower end of the body part 32, which is not provided with the aforementioned recess. Thus, as shown in FIG. 9A, the upper surface 33a of the distal end part 33 can be configured to be located below the support portion of each string-shaped support 23 which contacts the skin 81 at the initial position.

Figure 9B:
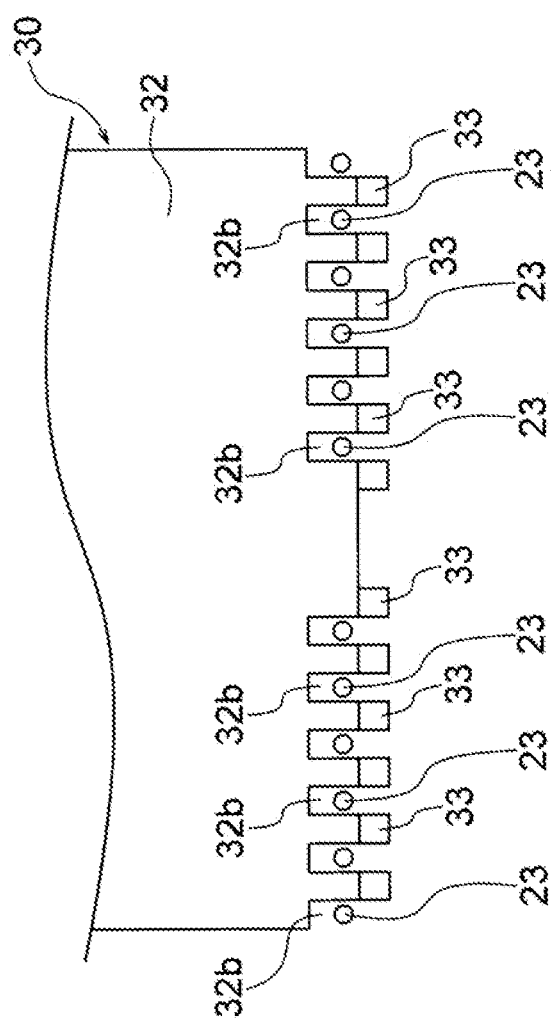
FIG. 9B is a rear view of a support unit of a food material processing mechanism (view seen along an IXB arrow of FIG. 9A).
Figure 9C:
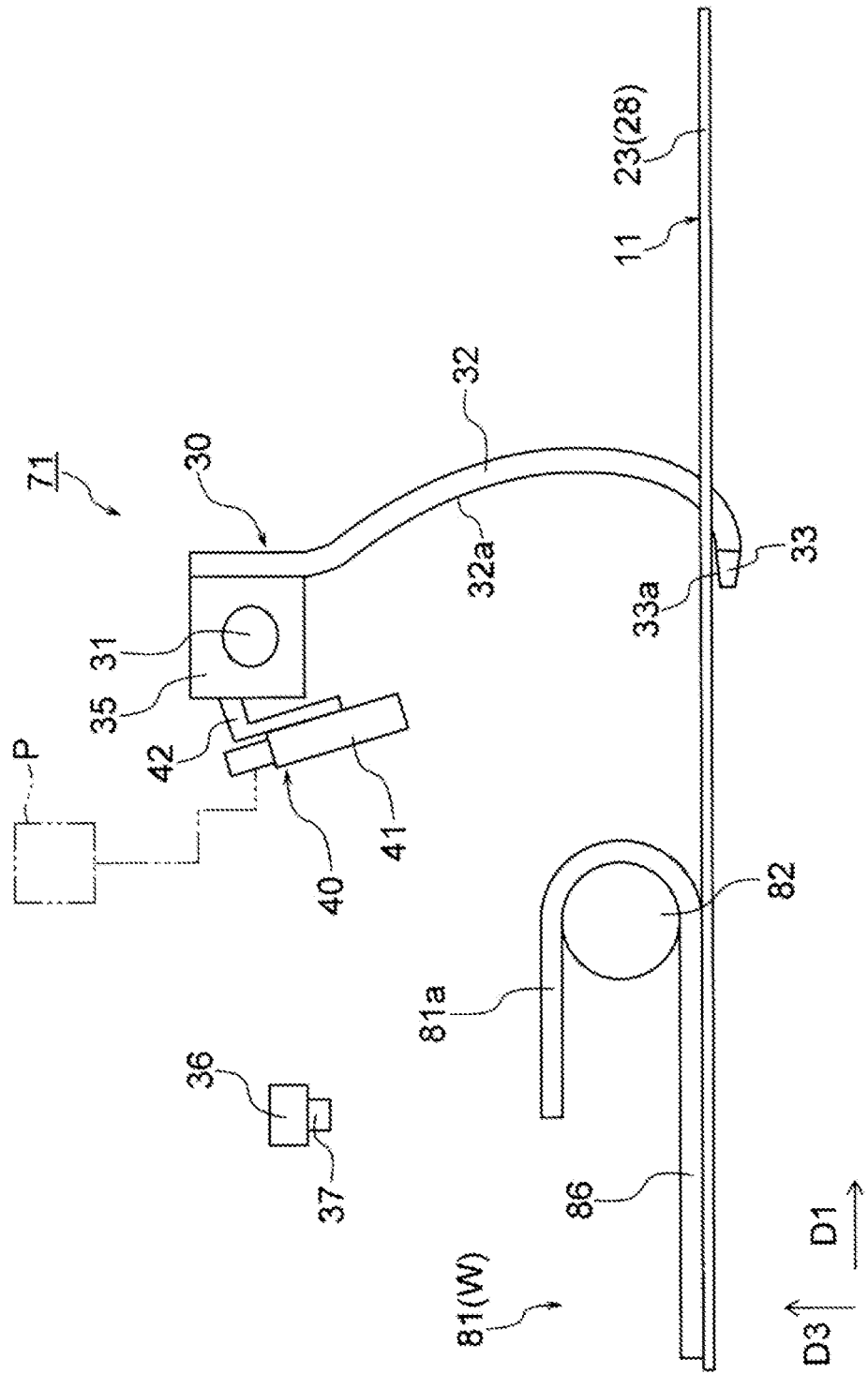
FIG. 9C is a side view of a modification example of a food material processing mechanism.

In the aforementioned example, a case in which the support unit 30 has the body part 32 and the distal end part 33 coupled to the body part 32, and the body part 32 has a flat plate-like shape is described as a preferred structure which enables a work W to be vertically reversed more stably. However, the structure of the support unit 30 is not limited thereto. For example, as shown in FIG. 9C, when seen from a lateral side, the front surface 32a of the body part 32 may have a curved shape which is concaved to the downstream side of the conveyance direction D1. In addition, the support unit 30 may have a body part 32 and a distal end part 33 which are integrally molded to each other.

Such a support unit 30 may be connected to a below-described control unit 50, and may be configured to be rotated to the downstream side of the conveyance direction D1 based on a signal from the control unit 50.

[Pressing Unit]

Figure 12:
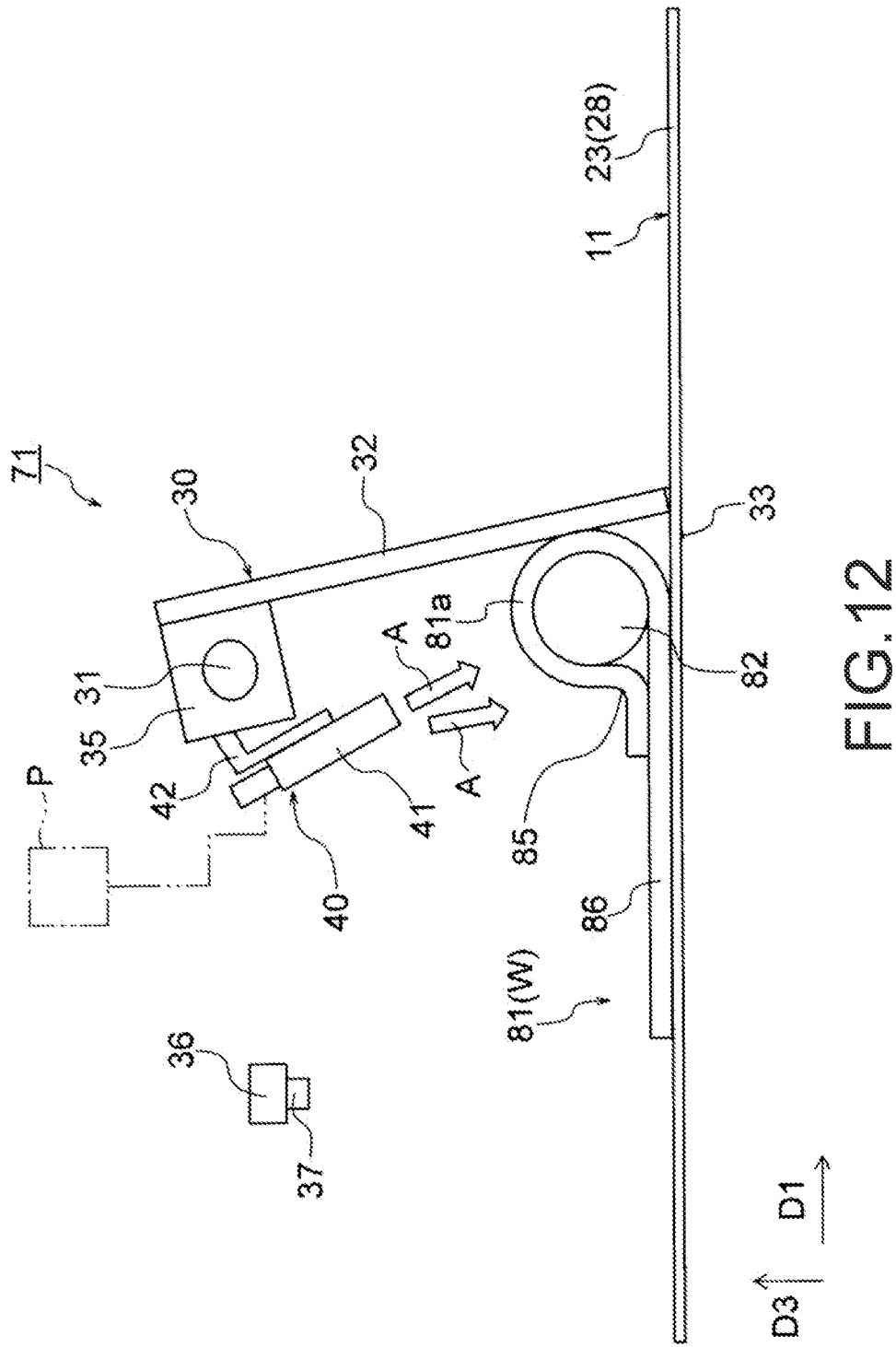
FIG. 12 is a side view of a food material processing mechanism.

The pressing unit 40 has an air supply source P, and an air jet nozzle 41 connected to the air supply source P. The pressing unit 40 is configured to create the bending reference portion 85 (see FIGS. 12 and 13) by jetting air A, which has been supplied from the air supply source P, from the air jet nozzle 41 to locally apply force to the folded portion 81a of the skin 81. The pressing unit 40 in this embodiment is configured to press the folded portion 81a of the skin 81 by air A jetted therefrom. Since the pressing unit 40 presses the skin 81 by jetting air thereto, the bending reference portion 85 can be easily created while the skin 81 is successively conveyed. Thus, the skin 81 can be accurately folded and rapidly processed, resulting in improvement in food productivity. In addition, since the pressing unit 40 presses the skin 81 by air A, the bending reference portion 85 can be reliably formed without any mistake, and defects such as scratching is unlikely to occur. Further, since the pressing unit 40 presses the skin 81 by air A, as compared with a case in which the skin 81 is pressed by a flat plate-shaped member which is brought into contact with the skin 81, for example, risk of foreign matter contamination can be reduced, and need for cleaning the pressing member can be eliminated. Further, an installation cost of the pressing unit 40 can be reduced. Moreover, as shown in FIG. 12, when the filling 82 is placed on the skin 81 conveyed by the conveyance unit 11, for example, the skin 81 can be brought into tight contact with the filling 82 because the pressing unit 40 presses the skin 81 by air A.

A commercially available air jet nozzle of a spot type, a flat type, a round type, an amplification type, etc. can be used as the air jet nozzle 41 of the pressing unit 40. One or more air jet nozzles 41 can be installed along the conveyance direction D1 or the width direction D2 of the work W. An injection time during the pressing unit 40 jets air A may be, for example, about 0.1 seconds to 0.3 seconds, although it can be suitably set depending on a conveyance speed, a shape of a soft food material and its condition. In this case, the pressing unit 40 may be configured to continuously jet air A while the work W is being supported on the support unit 30, for example.

A compression pump or a blower may be used as the air supply source P. A pressure at which the pressing unit 40 jets air A can be suitably set depending on a shape of the air jet nozzle 41, the number thereof, a distance between the air jet nozzle 41 and the work W, softness of a skin material. For example, when a compression pump is used as the air supply source P, and one air jet nozzle 41 of a flat type is installed at a distance of about 5 to 50 mm from a work W as a spring roll, an air pressure of the compression pump may be about 0.1 MPa or more and 0.2 MPa or less. In this case, since the pressure at which the pressing unit 40 jets air A is 0.1 MPa or more, the folded portion 81a of the skin 81 can be effectively pressed, and the bending reference portion 85 can be easily formed on the folded portion 81a. In addition, since the pressure at which the pressing unit 40 jets air A is 0.2 MPa or less, it can be suppressed that the skin 81 of the folded portion 81a, which is near the first vertex C1 (see FIG. 1B), and the skin 81 of the folded portion 81a, which is located on each side of the filling 82 in the width direction D2, is turned over by air A.

In the illustrated structure, the pressing unit 40 presses a part of the folded portion 81a of the skin 81 along the width direction D2. Thus, the bending reference portion 85 along the width direction D2 can be created on the folded portion 81a of the skin 81. In this case, the pressing unit 40 may press, along the width direction D2, the folded portion 81 of the skin 81 either linearly or at two or more locations. In this case, the pressing unit 40 preferably presses an extent of an area B (see FIG. 5) of the folded portion 81a, which corresponds to the width of the filling 82, in the width direction D2. Thus, it can be suppressed that the skin 81 of the folded portion 81a, which is located on each side of the filling 82 in the width direction D2, is turned over by air A.

In the illustrated structure, the pressing unit 40 is provided rotatably with respect to the rotation shaft 31. To be specific, the pressing unit 40 is coupled to the rotation shaft 31 through a second coupling member 42 fixed on a first coupling member 35. Thus, when the aforementioned support unit 30 is rotated to the downstream side of the conveyance direction D1, the pressing unit 40 is configured to be rotated to the downstream side of the conveyance direction D1 together with the support unit 30. As a result, as described later, when the pressing unit 40 forms the bending reference portion 85, the pressing unit 40 can continuously press substantially the same part of the skin 81 of the folded portion 81a.

Figure 13:
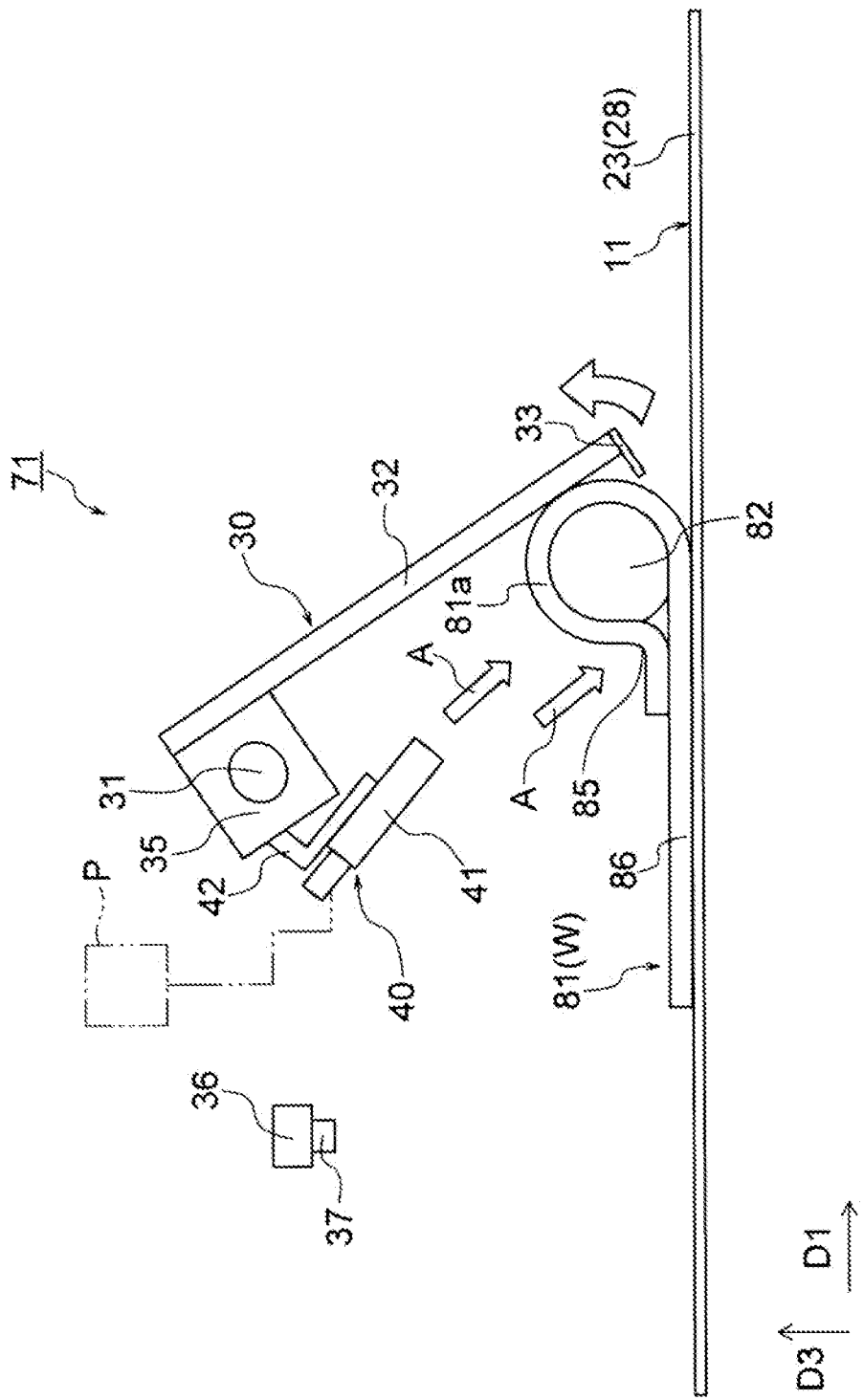
FIG. 13 is a side view of a food material processing mechanism.

In this embodiment, as shown in FIGS. 12 and 13, the pressing unit 40 preferably brings the skin 81 into tight contact with the filling 82, and presses near a boundary between a portion where the skin 81 is in tight contact with the filling 82, and a portion of of the folded portion 81a where the skins 81 are in tight contact with each other. Thus, it can be suppressed that a gap is formed between the skin 81 and the filling 82 and between the skins 81.

Such a pressing unit 40 may be connected to the below-described control unit 50, and may be configured to jet air A and to be rotated to the downstream side of the conveyance direction D1 based on a signal from the control unit 50.

The food material processing mechanism 71 comprising the support unit 30 and the pressing unit 40 as structured above can simultaneously perform the formation of the bending reference portion 85 on a work W (in particular, skin 81), and the vertical reversal of at least a part of the folded portion 81a. The skin 81 of the work W, which has been subjected to such a process by the food material processing mechanism 71, is then conveyed to the downstream side, and is subjected to the aforementioned third folding/fourth folding step S4.

The food material processing mechanism 71 in this embodiment is highly versatile and thus can handle works W of various sizes. For example, the same food material processing mechanism 71 can be used for works W (in particular, skins 81) having a size of about 60 mm to 120 mm in the width direction D2.

In addition, the support unit 30 and the pressing unit 40 can simultaneously perform the formation of the bending reference portion 85 on the work W (in particular, skin 81), and the folding of at least a part of the folded portion 81a. Thus, as compared with a case in which these processes are performed separately from each other, the processing speed can be increased. In particular, since the pressing unit 40 presses the skin 81 while the support unit 30 is supporting the skin 81, displacement of the skin 81 can be prevented whereby the bending reference portion 85 can be accurately formed.

Since the skin 81 of the work W can be accurately folded at an increased process speed, the bottleneck can be eliminated to improve the food productivity of the system as a whole.

The food material processing mechanism 71 can further comprise other necessary devices.

For example, a trigger sensor 37 capable of detecting the passage of a skin 81 (work W) at a given position on the conveyance path of a skin 81 may be provided. FIGS. 5 to 16 show by way of example the trigger sensor 37 provided on the upstream side of the support unit 30. The trigger sensor 37 is mounted on a support shaft 36 which extends in the width direction D2 above the conveyance unit 11 (in particular, string-shaped supports 23). The trigger sensor 37 can detect the passage of a skin 81 at a position directly below. The trigger sensor 37 may be installed at another position to detect the passage of a skin 81 at another position on the conveyance path. The trigger sensor 37 may be formed by a given device such as a photo sensor. The trigger sensor 37 transmits a detection result to the control unit 50 (see FIG. 16).

Figure 16:
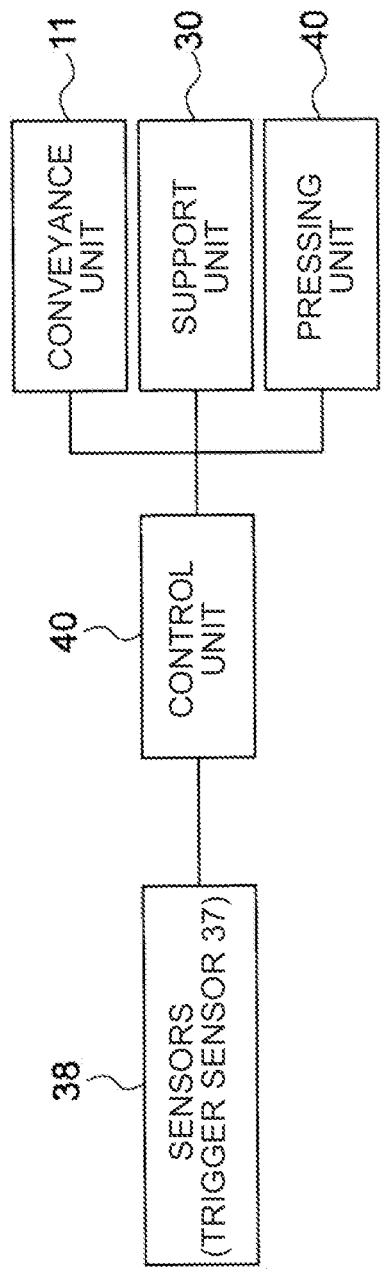
FIG. 16 is a block diagram showing an example of a functional structure of a control unit.

FIG. 16 is a block diagram shown an example of a functional structure of the control unit 50. Sensors 38 (e.g., trigger sensor 37), the support unit 30 and the pressing unit 40 are connected to the control unit 50 shown in FIG. 16. The control unit 50 also controls the drive of the conveyance unit 11 (string-shaped supports 23, conveyance body 28) in the food material processing mechanism 71. In the illustrated food material processing mechanism 71, at least one of the rotation shafts around which the string-shaped supports 23 are wound is rotated by the control unit 50. Each of the rotation shafts may be rotated by a given power generator such as a motor.

[Food Material Processing Method]

Next, a food material processing method of the present invention is described. The food material processing method of the present invention is a food material processing method for manufacturing rolled food, which includes a step of bending a sheet-shaped soft food material, characterized in that, in the step of bending the sheet-shaped soft food material, a folded portion 81*a* of the sheet-shaped soft material that is at least partially folded back is pressed by jetting air thereto, to form a bending reference portion 85 serving as a reference portion for bending. The food material processing method of the present invention can be performed by using the aforementioned food material processing mechanism 71, for example. The food material processing method is described herebelow based on a case in which the food material processing mechanism 71 is used.

In this case, a work W is conveyed by the conveyance body 28 of the conveyance unit 11 from the upstream side to the downstream side. A bending reference portion 85 is formed on the work W by the support unit 30 and the pressing unit 40.

Figure 5:
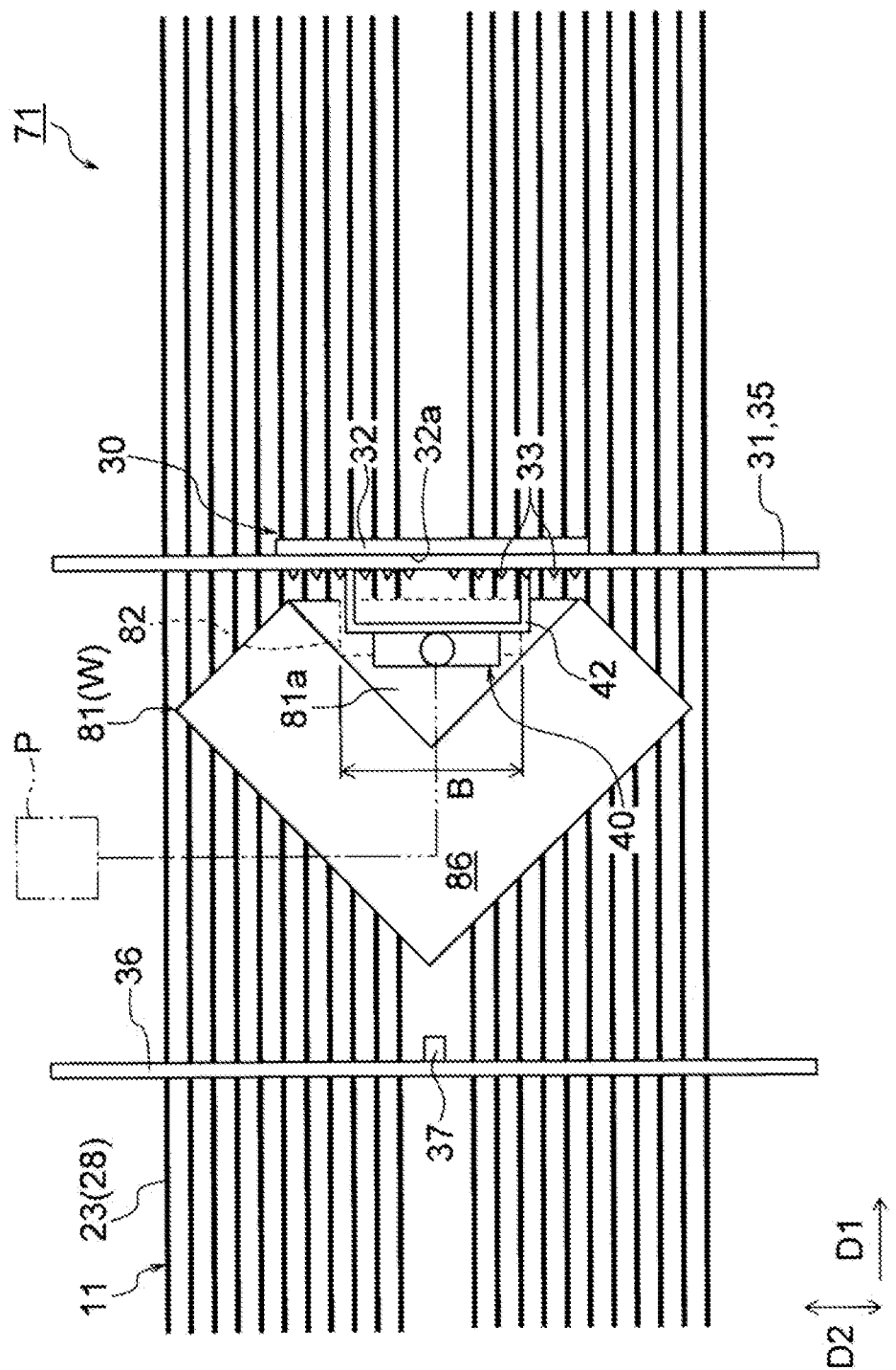
FIG. 5 is a plan view of a food material processing mechanism.
Figure 10:
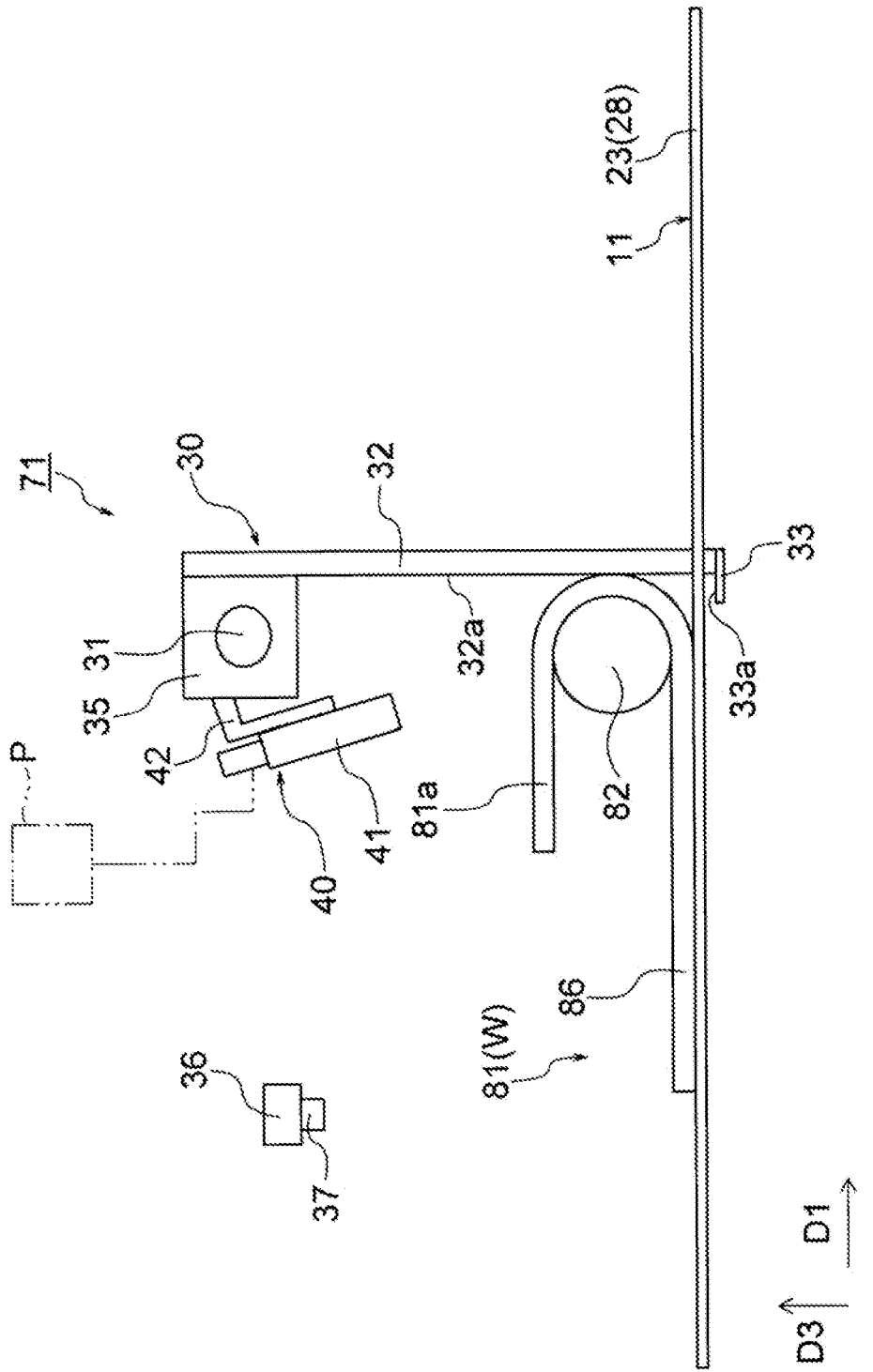
FIG. 10 is a side view of a food material processing mechanism.

In order thereto, as shown in FIGS. 5 and 9A, the work W is firstly moved in the conveyance direction D1. Then, as shown in FIG. 10, the work W comes into contact with the main body 32 of the support unit 30. Thus, the work W is supported by the support unit 30.

Figure 6:
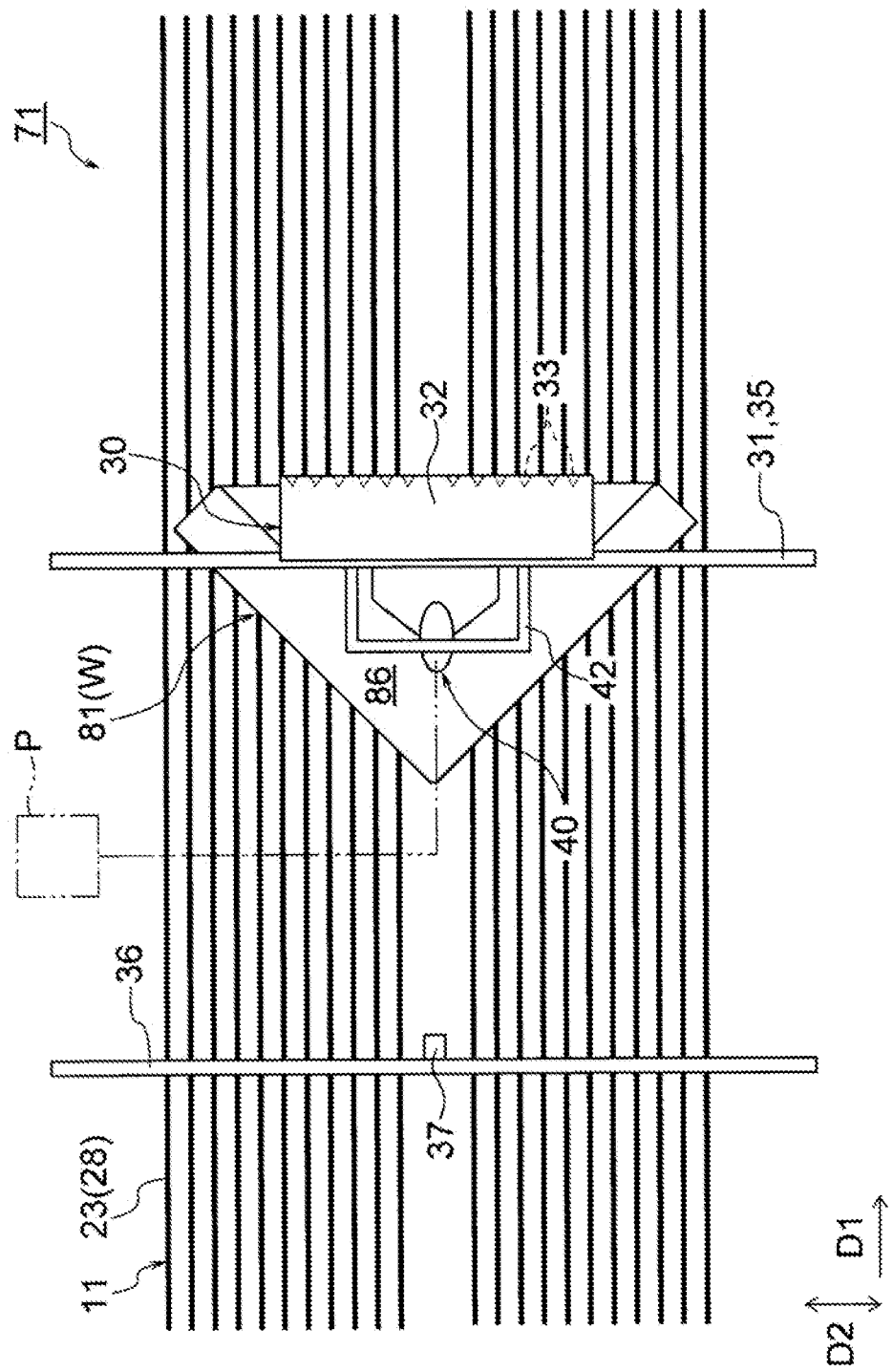
FIG. 6 is a plan view of a food material processing mechanism.
Figure 11:
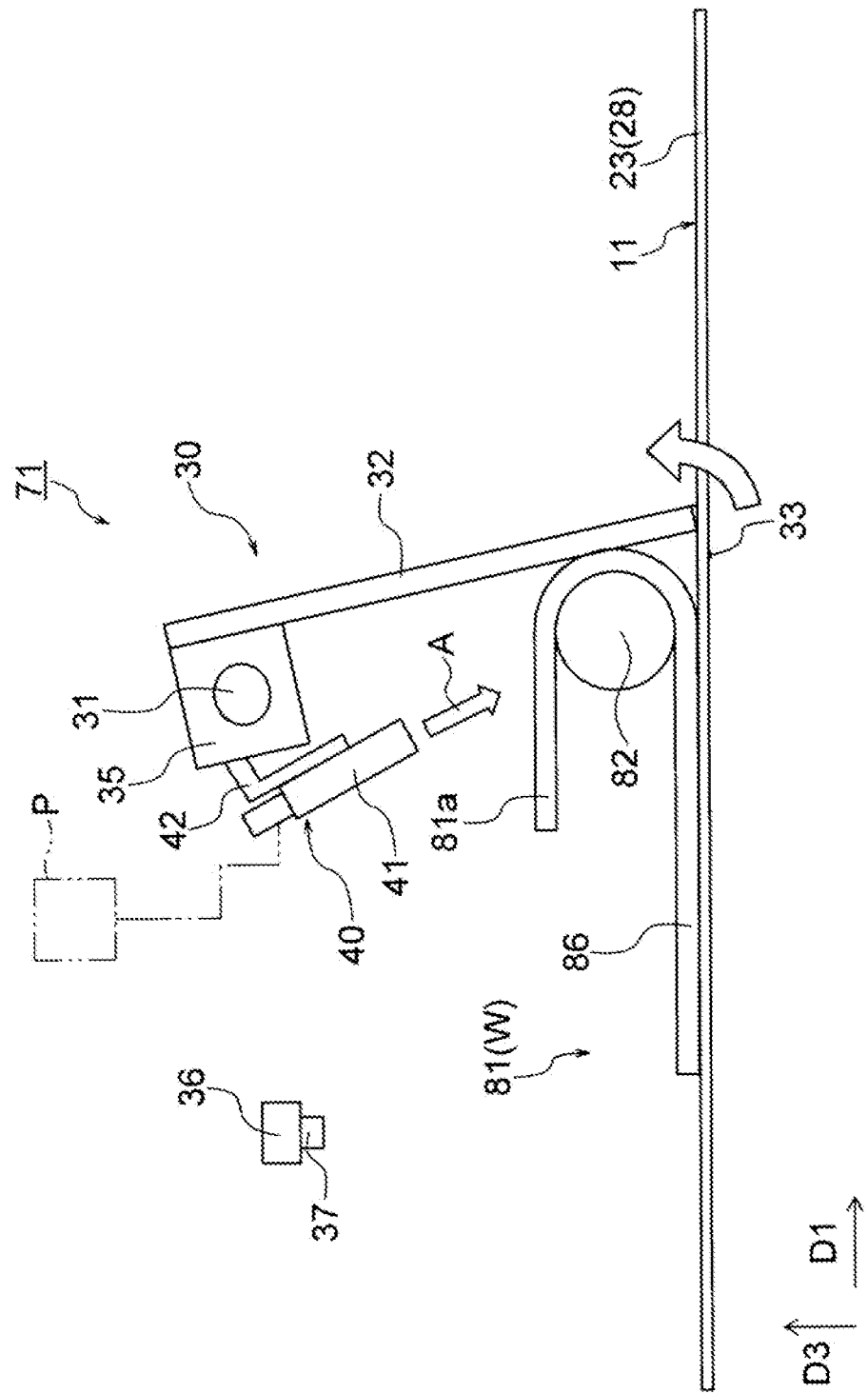
FIG. 11 is a side view of a food material processing mechanism.

Then, as shown in FIGS. 6 and 11, the support unit 30 is rotated to the downstream side of the conveyance direction D1, while supporting the work W. Thus, the work W, which is conveyed by the successively traveling conveyance body 28, can be processed without stopping the conveyance of the work W, which can improve the food productivity and increase the processing speed. At this time, the support unit 30 is rotated to the downstream side of the conveyance direction D1 based on a signal from the control unit 50, for example. As described above, since the pressing unit 40 is coupled to the rotation shaft 31 through the second coupling member 42 fixed on the first coupling member 35, the pressing unit 40 is also rotated to the downstream side of the conveyance direction D1 together with the support unit 30. Then, the pressing unit 40 jets air A based on a single from the control unit 50. To be specific, air A is supplied from the air supply source P, and is jetted from the air jet nozzle 41. Thus, as shown in FIG. 12, the skin 81 of the folded portion 81*a* is brought into tight contact with the filling 82. In addition, air A is jetted near a boundary between the skin 81 of the folded portion 81*a*, which is in tight contact with the filling 82, and the skin 81 of the folded portion 81*a*, which is in tight contact with the skin 81 of the base portion 86, so that the formation of the bending reference portion 85 is started.

Figure 7:
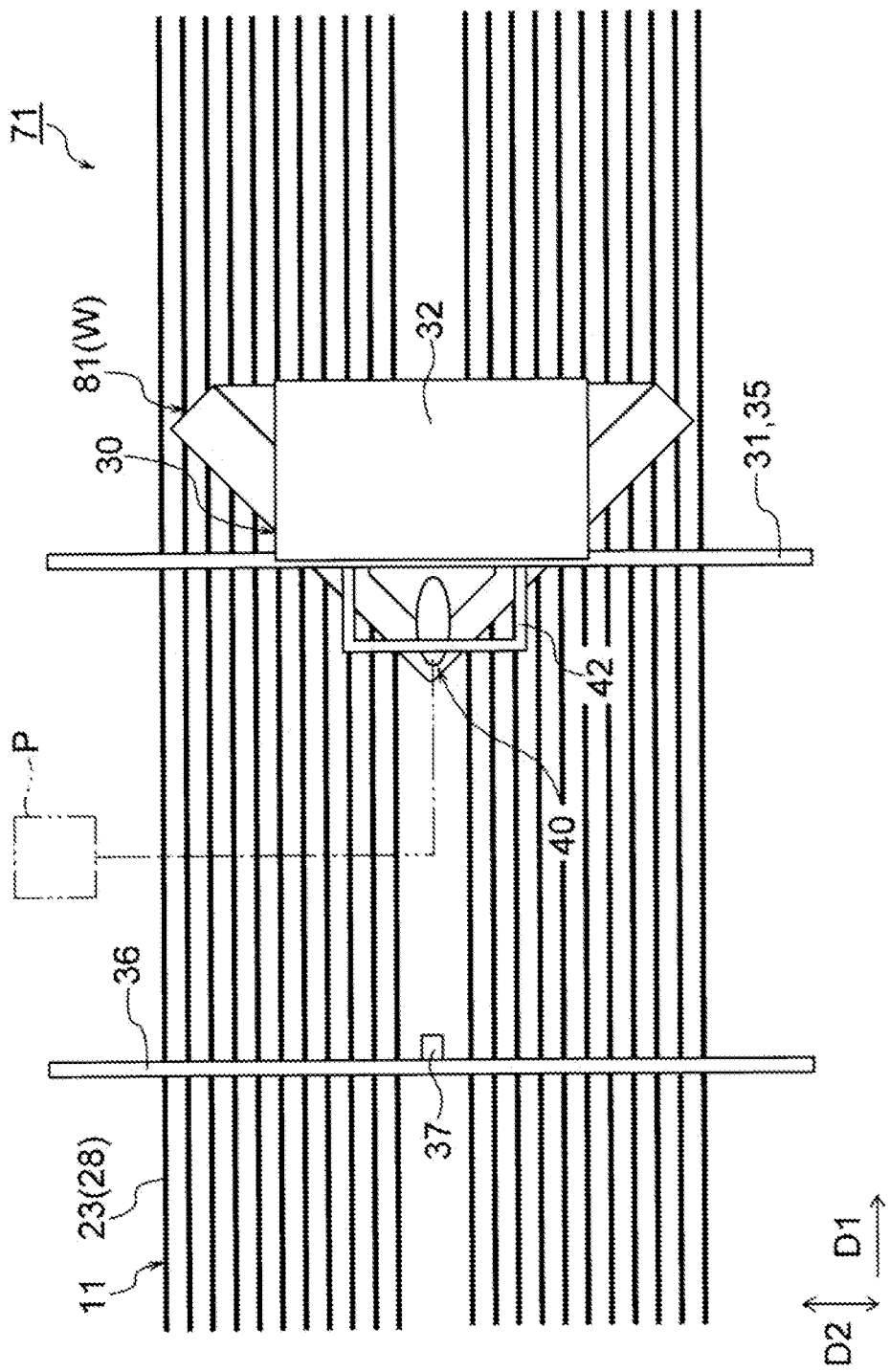
FIG. 7 is a plan view of a food material processing mechanism.

Then, as shown in FIGS. 7 and 13, the support unit 30 and the pressing unit 40 are further rotated to the downstream side of the conveyance direction D1. Also in this situation, the pressing unit 40 can continue to jet air A. Thus, as shown in FIG. 13, the skin 81 of the folded portion 81*a* is surely brought into tight contact with the filling 82. During this, air A is jetted near a boundary between the skin 81 of the folded portion 81*a*, which is in tight contact with the filling 82, and the skin 81 of the folded portion 81*a*, which is in tight contact with the skin 81 of the base portion 86, so that the bending reference portion 85 is formed. The support unit 30 is rotated to the downstream side of the conveyance direction D1 while supporting the work W, and the pressing unit 40 is also rotated to the downstream side of the conveyance direction D1 together with the support unit 30. Thus, during the formation of the bending reference portion 85, the pressing unit 40 can continue to press substantially the same part of the skin 81 of the folded portion 81*a*. Thus, the pressing unit 40 can accurately form the bending reference portion 85.

As described above, the food material processing method of the present invention includes an aspect in which the formation of the bending reference portion is performed to the food material that is conveyed by the successively traveling conveyance body 28.

Figure 14:
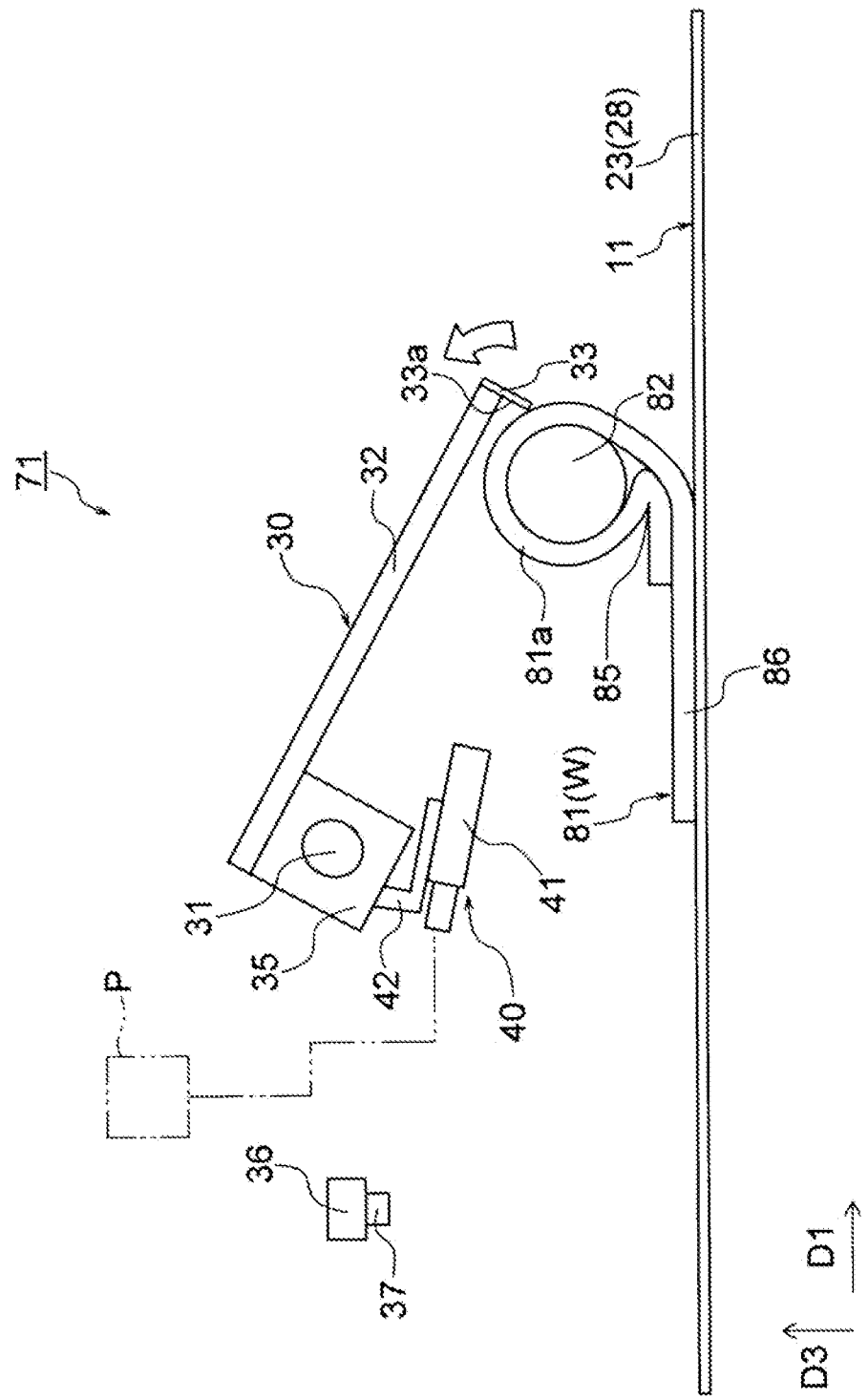
FIG. 14 is a side view of a food material processing mechanism.

Then, as shown in FIG. 14, the support unit 30 and the pressing unit 40 are further rotated to the downstream side of the conveyance direction D1. At the initial position (see FIG. 9A), the upper surface 33*a* of the distal end part 33 is configured to be located below the support portion of each string-shaped support 23 which contacts the skin 81. Thus, when the support unit 30 is rotated to the downstream side of the conveyance direction D1, the upper surface 33*a* of the distal end part 33 of the support unit 30 comes into contact with the work W. Thus, the filling 82 and a part of the skin 81 of the folded portion 81*a* of the work W are supported by the support unit 30, such that the filling 82 and a part of the skin 81 of the folded portion 81*a* of the work W is raised upward.

The work W is being conveyed by the conveyance unit 11 to the downstream side of the conveyance direction D1. Thus, the base portion 86 of the work W is moved to the downstream side of the conveyance direction D1. On the other hand, as described above, the filling 82 and a part of the skin 81 of the folded portion 81*a* of the work W are supported by the support unit 30 so as to be raised upward. Thus, the base portion 86 of the work W is moved to be positioned below the filling 82 and a part of the skin 81 of the folded portion 81*a*. The bending reference portion 85 has been formed on the skin 81 of the folded portion 81*a*. Thus, a part of the skin 81 of the folded portion 81*a* is bent along the bending reference portion 85, so that the filling 82 and a part of the skin 81 of the folded portion 81*a* are vertically reversed so as to be folded on the base portion 86.

In this manner, as shown in FIG. 1C, the skin 81 (work W) on which the bending reference portion 85 has been formed is neatly folded.

As described above, the food material processing method of the present invention can further include a step of vertically reversing the sheet-shaped soft food material with reference to the bending reference portion 85.

Figure 8:
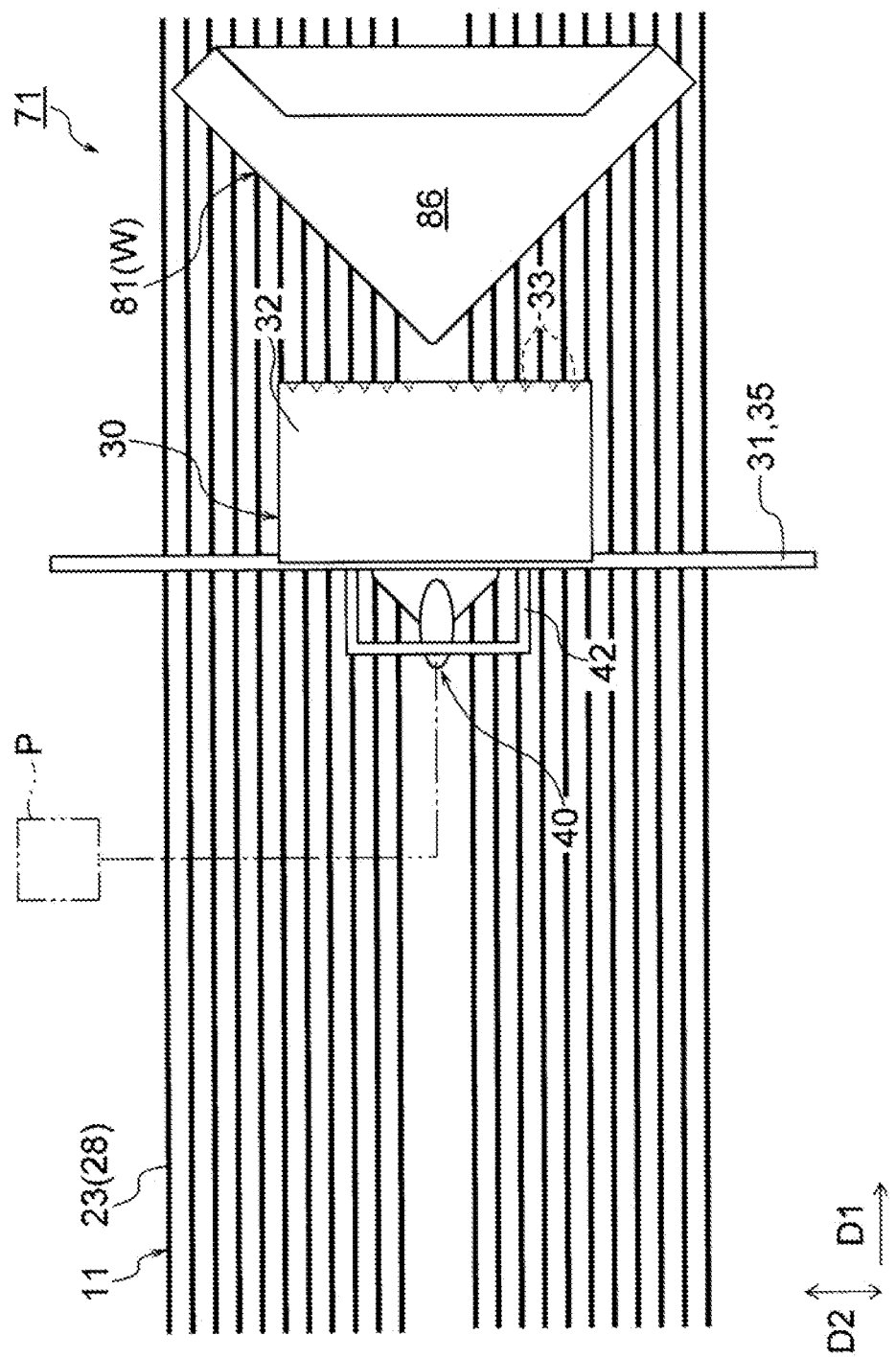
FIG. 8 is a plan view of a food material processing mechanism.
Figure 15:
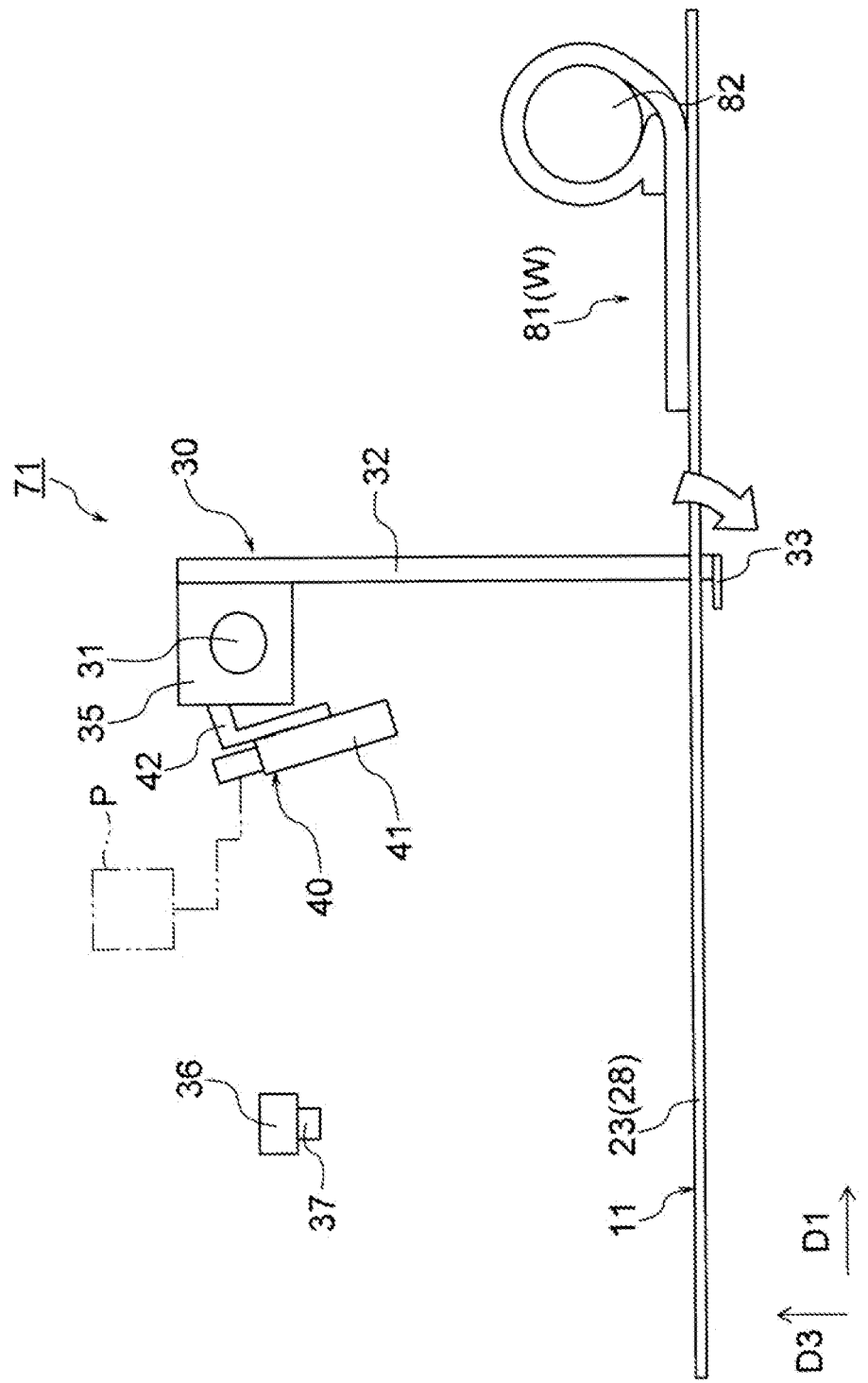
FIG. 15 is a side view of a food material processing mechanism.

After these processes, as shown in FIGS. 8 and 15, the folded skin 81 (work W) is conveyed to the downstream side. The support unit 30 is rotated to the upstream side of the conveyance direction D1 so as to return to the initial position.

As described above, according to this embodiment, the pressing unit 40 presses a part of the folded portion 81*a* by jetting air thereto. Thus, the bending reference portion 85 can be accurately formed on a desired position of the skin 81 of the work W, so that the skin 81 of the work W can be accurately bent and folded. In addition, since the pressing unit 40 presses the skin 81 by jetting air thereto, the bending reference portion 85 can be easily created on the work W which is conveyed by the successively traveling conveyance body 28. Thus, the skin 81 can be accurately folded and rapidly processed, resulting in improvement in food productivity. Further, since the pressing unit 40 presses the skin 81 by air A, the bending reference portion 85 can be reliably formed without any mistake, and defects such as scratching is unlikely to occur.

In addition, according to this embodiment, the pressing unit 40 presses a part of the folded portion 81*a* along the width direction D2 by jetting air thereto. Thus, the bending reference portion 85 along the width direction D2 can be created on the folded portion 81*a* of the skin 81. As a result, the work W folded in a state shown in FIG. 1C can be easily obtained.

In addition, according to this embodiment, the pressing unit 40 is provided rotatably with respect to the rotation shaft 31. Thus, during the formation of the bending reference portion 85 by the pressing unit 40, the pressing unit 40 can continue to press substantially the same part of the skin 81 of the folded portion 81a.

In addition, according to this embodiment, the support unit 30 is rotated to the downstream side of the conveyance direction D1, while supporting the work W conveyed by the conveyance unit 11. Thus, the work W, which is conveyed by the successively traveling conveyance body 28, can be processed without stopping the conveyance of the work W, which can improve the food productivity and increase the processing speed.

In addition, according to this embodiment, the support unit 30 includes the body part 32 coupled to the rotation shaft 31, and the distal end part 33 coupled to the body part 32. When the support unit 30 is rotated to the downstream side of the conveyance direction D1, the distal end part 33 vertically reverses the folded portion 81a at least partially along the bending reference portion 85. Thus, the skin 81 on which the bending reference portion 85 has been formed can be easily folded.

[Application Examples]

The aforementioned food material processing mechanism 71 and the food material processing method can be applied to various food manufacturing apparatuses, food manufacturing systems and food manufacturing methods. For example, a food manufacturing method can manufacture various foods by using a sheet-shaped soft food material (skin 81 of work W) in which a bending reference portion 85 is formed by the above-mentioned food material processing method using the food material processing mechanism 71.

For example, skins used for burritos, crepes or other wrap foods (in other words, food in which filling is wrapped with skin) can be suitably bent by the apparatus and the method described above. Fillings placed on a skin are not limited, and may include, for example, a solid food material, a liquid food material and/or a gel food material (e.g., jelly). Further, an object other than a food material may be placed on a skin. For example, a solid tool, a sheet, a liquid material and a gel material, which are not food materials, may be placed on a skin. Moreover, a skin used in a food (e.g., egg roll) containing only the skin without any filling can be also suitably bent by the apparatus and the method described above. In addition, sheet-shaped soft food materials other than skins can be also suitably bent by the apparatus and the method described above. The components, the shapes and the sizes (i.e., planar size and thickness) of such sheet-shaped flexible food materials are not particularly.

Figure 17:
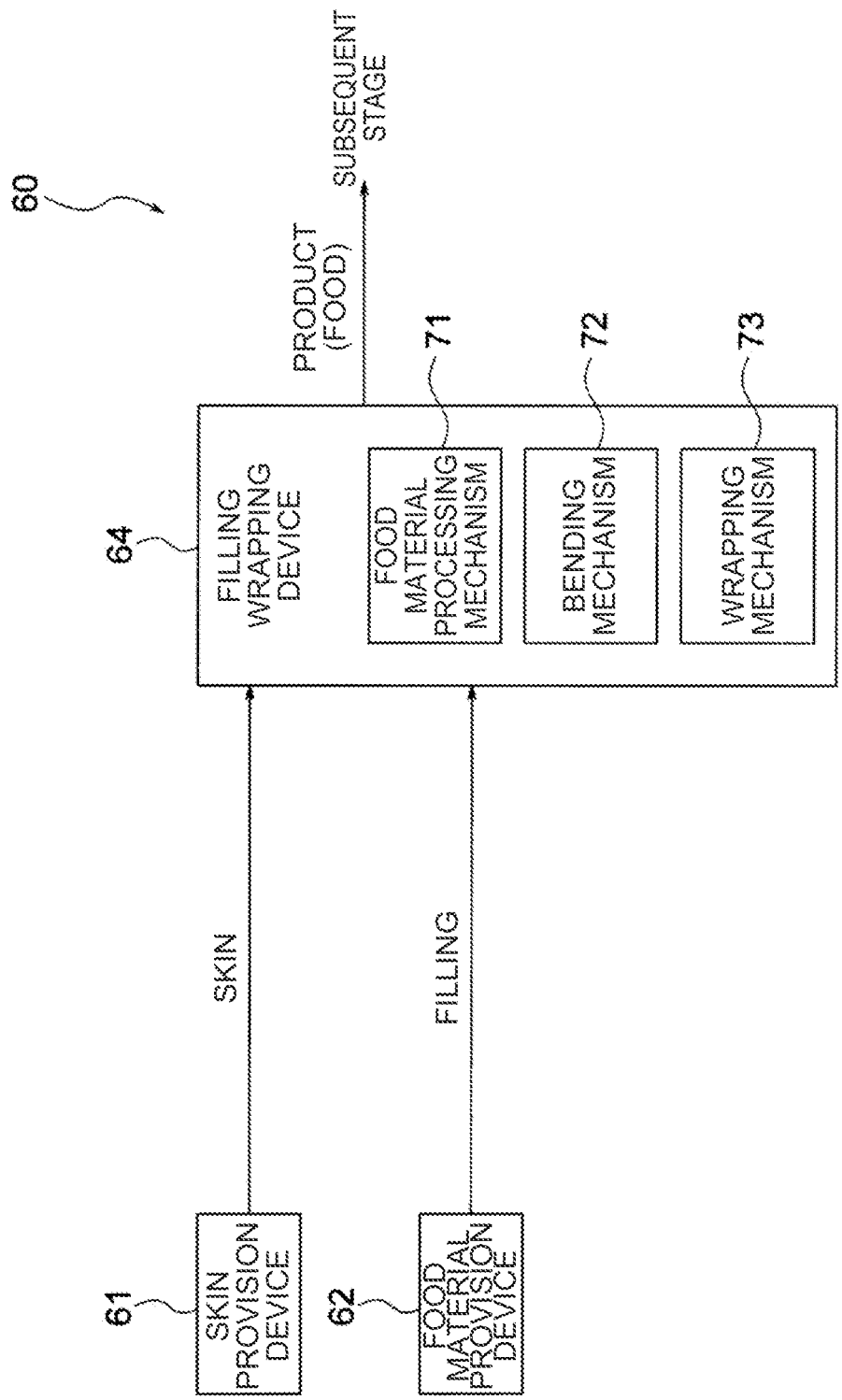
FIG. 17 is a block diagram showing an example of a food manufacturing system.

As shown in FIG. 17, such a food manufacturing system may comprise at least the aforementioned food material processing mechanism 71, and a bending mechanism 72 that bends a skin 81 with reference to a bending reference portion 85. In addition, a food material manufacturing method can use a skin 81 on which a bending reference portion 85 has been formed and which has been folded by the aforementioned method.

FIG. 17 is a block diagram showing an example of a food manufacturing system 60. The food manufacturing system 60 shown in FIG. 17 comprises a skin provision device 61 and a food material provision device 62, in addition to a filling wrapping device 64 including the aforementioned food material processing mechanism 71, the bending mechanism 72 and a wrapping mechanism 73.

The skin provision device 61 is a device which prepares a skin for wrapping a filling. A skin prepared by the skin provision device 61 is sent therefrom to the filling wrapping device 64 by a transportation device such as a conveyor. The specific structure and function of the skin provision device 61 are not limited. For example, the skin provision device 61 may perform manufacturing and shaping (such as cutting) of a skin, may perform only shaping of a skin which is manufactured in advance, or may simply send a skin which is shaped in advance, in a desired state, toward the filling wrapping device 64. Further, the skin provision device 61 may perform other processes and, for example, may perform various pretreatments on a skin.

The filling provision device 62 is a device which prepares a filling (e.g., paste-like food material) to be wrapped with a skin. A filling prepared by the filling provision device 62 is sent therefrom to the filling wrapping device 64 by a transportation device such as a conveyor. The specific configuration and function of the food material provision device 62 are not limited. For example, the food material provision device 62 may perform cutting and mixing of a filling, may only mix a filling that is cut in advance, or may simply send a filling which is mixed in advance, in a desired state, toward the filling wrapping device 64. Further, the food material provision device 62 may perform other processes and, for example, may perform various pretreatments on a filling.

The filling wrapping device 64 performs a process of wrapping a quantitated filling sent from the food material provision device 62 with a skin sent from the skin provision device 61 to manufacture a product (food) (see FIGS. 1A to 1F). On this occasion, a skin 81 is bent by the food material processing mechanism 71 in accordance with the aforementioned method. The skin 81 is folded by the bending mechanism 72 that folds the skin 81 of the work W and the wrapping mechanism 73. Namely, the filling wrapping device 64 may comprise the aforementioned food material processing mechanism 71. Then, a product (food such as spring roll 80 (see FIG. 1F)) produced by the filling wrapping device 64 is sent to a subsequent stage by a transportation device such as a conveyor, and various processes are performed in the subsequent stage as needed.

The food manufacturing system 60 shown in FIG. 17 is a mere example. In the food manufacturing system 60, any device may be combined with the food material processing mechanism 71 and/or the bending mechanism 72 described above. In addition, in the food manufacturing method, any process may be combined with the aforementioned food material processing method. For example, in a food manufacturing system 60 and a food manufacturing method which manufacture a food without any filling, the food material provision device 62 is unnecessary. Further, in a case where a filling is manually supplied directly to the filling wrapping device 64, the food material provision device 62 is unnecessary.

As described above, according to a food manufacturing system 60 comprising the food material processing mechanism 71 of the present embodiment, the bottleneck of the process which may be caused by the food material processing mechanism 71 can be improved, a large number of rolled foods can be successively and stably manufactured at high speed and in a smooth manner, and the productivity can be improved.

The present invention is not limited to the above-described embodiments and variant examples. For example, various modifications may be added to each element of the above-described embodiments and variant examples. In addition, embodiments comprising components and/or methods other than the above-mentioned components and/or methods are also included in the embodiments of the present invention. Further, embodiments which do not comprise a part of the above-mentioned components and/or methods are also included in the embodiments of the present invention. Moreover, embodiments comprising some components and/or methods included in certain embodiments of the present invention and some components and/or methods included in other embodiments of the present invention are also included in the embodiments of the present invention. Therefore, components and/or methods included in the above-described embodiments, the above-described variant examples, and embodiments of the present invention which are not described above may be combined with each other, and embodiments related to such combinations are also included in the embodiments of the present invention. Further, the effects produced by the present invention is not limited to the above-mentioned effects, and a particular effect according to the specific configuration of each embodiment can be exhibited. As described above, various additions, modifications and partial deletions may be made to each element described in the claims, the specification, the abstract and the drawings without departing from the technical idea and purpose of the present invention.

The invention claimed is:

1. A food material processing mechanism that process a sheet-shaped soft food material including a folded portion where at least a portion of the sheet-shaped food material is folded back, comprising:
   a conveyance unit that conveys the soft food material in a conveyance direction;
   a support unit that is provided rotatably with respect to a rotation shaft extending in a width direction orthogonal to the conveyance direction, to support the soft food material conveyed by the conveyance unit; and
   a pressing unit that presses by jetting air a part of the folded portion of the soft food material supported by the support unit, to form a bending reference portion serving as a reference portion for bending, the pressing unit being coupled to the rotation shaft so that the support unit and the pressing unit are rotated together with respect to the rotation shaft, wherein
   the support unit and the pressing unit are configured so that the pressing unit is rotated in the conveyance direction together with the support unit, and the pressing unit presses the part of the folded portion of the soft food material by air jetted, while the support unit supports the soft food material, which is conveyed in the conveyance direction.

2. The food material processing mechanism according to claim 1, wherein
   the pressing unit presses the part of the folded portion along the width direction.

3. The food material processing mechanism according to claim 1, wherein
   the support unit is rotated to a downstream side of the conveyance direction, while supporting the soft food material conveyed by the conveyance unit.

4. The food material processing mechanism according to claim 3, wherein:
   the support unit includes a body part coupled to the rotation shaft, and a distal end part coupled to the body part; and
   when the support unit is rotated to the downstream side of the conveyance direction, the distal end part vertically reverses the folded portion at least partially along the bending reference portion.

5. The food material processing mechanism according to claim 1, wherein
   the pressing unit comprises an air nozzle for jetting air to the soft food material, the air nozzle being configured to be rotatable together with the support unit with respect to the rotation shaft.

* * * * *